(12) United States Patent
Iordanidis et al.

(10) Patent No.: US 9,611,035 B2
(45) Date of Patent: Apr. 4, 2017

(54) AIRCRAFT ELECTRIC BRAKING SYSTEM

(71) Applicant: AIRBUS OPERATIONS LIMITED, Bristol (GB)

(72) Inventors: George Iordanidis, Bristol (GB); John Rees, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 14/554,572

(22) Filed: Nov. 26, 2014

(65) Prior Publication Data
US 2015/0291279 A1 Oct. 15, 2015

(30) Foreign Application Priority Data

Nov. 27, 2013 (GB) .................................. 1320938.2

(51) Int. Cl.
| | | |
|---|---|---|
| *B60T 8/86* | (2006.01) | |
| *B64C 25/44* | (2006.01) | |
| *B60T 8/17* | (2006.01) | |
| *B60T 8/88* | (2006.01) | |
| *B64C 25/46* | (2006.01) | |
| *F16D 65/14* | (2006.01) | |
| *B60T 13/74* | (2006.01) | |
| *F16D 121/24* | (2012.01) | |

(52) U.S. Cl.
CPC ............ *B64C 25/44* (2013.01); *B60T 8/1703* (2013.01); *B60T 8/885* (2013.01); *B60T 13/741* (2013.01); *B64C 25/46* (2013.01); *F16D 65/14* (2013.01); *B60T 2270/402* (2013.01); *F16D 2121/24* (2013.01)

(58) Field of Classification Search
CPC .......... B60T 8/17; B60T 8/176; B60T 8/1703; B64C 24/44
USPC ........ 303/3, 15, 20, 126; 188/1.11 E, 1.11 L, 188/164
See application file for complete search history.

(56) References Cited

U.S. PATENT DOCUMENTS

| | | |
|---|---|---|
| 6,003,640 A | 12/1999 | Ralea |
| 6,115,656 A | 9/2000 | Sudolsky |

(Continued)

FOREIGN PATENT DOCUMENTS

| | | |
|---|---|---|
| EP | 1 484 244 | 12/2004 |
| EP | 2 284 054 | 2/2011 |

(Continued)

OTHER PUBLICATIONS

US Search Report for GB Application No. 1320938.2, dated Jun. 12, 2014, Jason Clee, 1 page.

(Continued)

*Primary Examiner* — Christopher Schwartz
(74) *Attorney, Agent, or Firm* — Nixon & Vanderhye P.C.

(57) ABSTRACT

An electrically actuated braking system for an aircraft, including: an electro-mechanical brake actuator (EMAbrake) proximate a wheel of the aircraft, the EMAbrake including a motor; an electro-mechanical actuator controller (EMAC) including a first motor controller for generating a first drive signal for the EMAbrake, and a second motor controller for generating a second drive signal for the EMAbrake, wherein the first motor controller and the second motor controller are dissimilar so as to provide protection against common mode failure of the first and second motor controllers.

23 Claims, 22 Drawing Sheets

(56) References Cited

U.S. PATENT DOCUMENTS

| | | | |
|---|---|---|---|
| 6,142,580 A | 11/2000 | Sinn et al. | |
| 6,183,051 B1* | 2/2001 | Hill | B60T 8/00 303/122.03 |
| 6,203,116 B1 | 3/2001 | Dieckmann | |
| 6,296,325 B1 | 10/2001 | Corio et al. | |
| 6,402,259 B2* | 6/2002 | Corio | B60T 8/1703 244/111 |
| 6,416,140 B1 | 7/2002 | Yamamoto et al. | |
| 6,471,015 B1 | 10/2002 | Ralea et al. | |
| 2001/0045771 A1 | 11/2001 | Corio et al. | |
| 2005/0110339 A1 | 5/2005 | Kolberg | |
| 2005/0148327 A1 | 7/2005 | Perez et al. | |
| 2005/0275281 A1* | 12/2005 | Prescott | B60T 8/1708 303/119.3 |
| 2006/0061210 A1 | 3/2006 | Ralea | |
| 2006/0108867 A1 | 5/2006 | Ralea | |
| 2007/0235267 A1 | 10/2007 | Liebert | |
| 2008/0030069 A1 | 2/2008 | Griffith et al. | |
| 2008/0133073 A1 | 6/2008 | Griffith et al. | |
| 2008/0179146 A1* | 7/2008 | Sullivan | B60L 7/26 188/164 |
| 2008/0258548 A1* | 10/2008 | May | B60T 8/1703 303/139 |
| 2008/0302813 A1 | 12/2008 | Yanagisawa et al. | |
| 2009/0276133 A1* | 11/2009 | May | B60T 7/042 701/75 |
| 2009/0278401 A1 | 11/2009 | Summers et al. | |
| 2010/0070150 A1* | 3/2010 | May | B60T 8/1703 701/71 |
| 2010/0078519 A1 | 4/2010 | Cahill | |
| 2010/0106347 A1 | 4/2010 | Cahill | |
| 2010/0274458 A1 | 10/2010 | Cahill et al. | |
| 2010/0276988 A1 | 11/2010 | Cahill | |
| 2010/0280725 A1 | 11/2010 | Cahill | |
| 2011/0040466 A1 | 2/2011 | Hill et al. | |
| 2011/0100769 A1* | 5/2011 | Frank | B60T 8/1703 188/106 R |
| 2011/0155521 A1* | 6/2011 | Thibault | B60L 7/003 188/106 P |
| 2011/0226569 A1 | 9/2011 | Devlieg | |
| 2012/0065816 A1* | 3/2012 | Cahill | B60T 8/00 701/3 |
| 2012/0145490 A1* | 6/2012 | Clary | B60T 8/1703 188/1.11 E |
| 2012/0175198 A1 | 7/2012 | Thibault et al. | |
| 2012/0217339 A1 | 8/2012 | Gilleran et al. | |
| 2012/0325573 A1 | 12/2012 | Miller | |
| 2013/0175403 A1* | 7/2013 | Spray | B60T 8/1703 244/235 |
| 2013/0253736 A1 | 9/2013 | Frank | |
| 2015/0151728 A1 | 6/2015 | Iordanidis et al. | |
| 2015/0291280 A1* | 10/2015 | Iordanidis | B60T 8/1703 244/111 |

FOREIGN PATENT DOCUMENTS

| | | |
|---|---|---|
| EP | 2 463 166 | 6/2012 |
| GB | 2 460 323 | 12/2009 |
| GB | 2469702 | 10/2010 |
| GB | 2469891 | 11/2010 |
| WO | WO 2008052051 | 5/2008 |
| WO | WO 2008/144378 | 11/2008 |
| WO | WO 2013/119242 | 8/2013 |

OTHER PUBLICATIONS

European Search Report cited in EP 14 19 5200 completed Mar. 18, 2015, six pages.

Search Report for GB Application No. 1320941.6, dated Jun. 12, 2014, Jason Clee, 1 page.

Extended Search Report in European Patent Application No. 14195206.9 mailed Apr. 8, 2015, 7 pages.

Search Report for GB Application No. 1320939.0, dated Jun. 12, 2014, Jason Clee, 1 page.

Extended Search Report in European Patent Application No. 14195202.8 mailed Apr. 7, 2015, 7 pages.

* cited by examiner

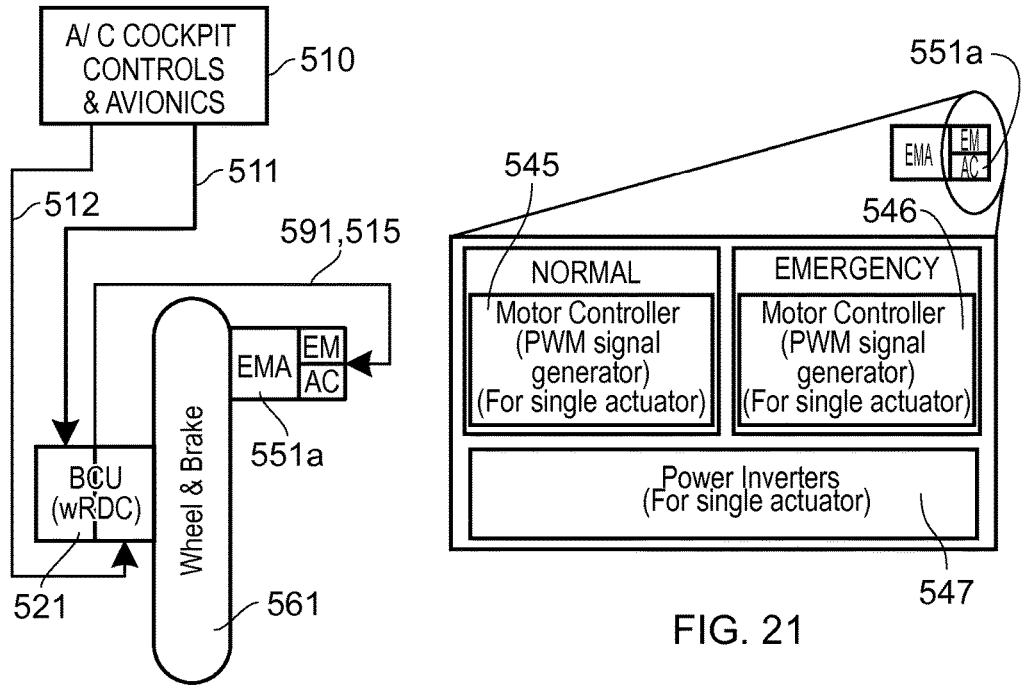
FIG. 20
FIG. 21
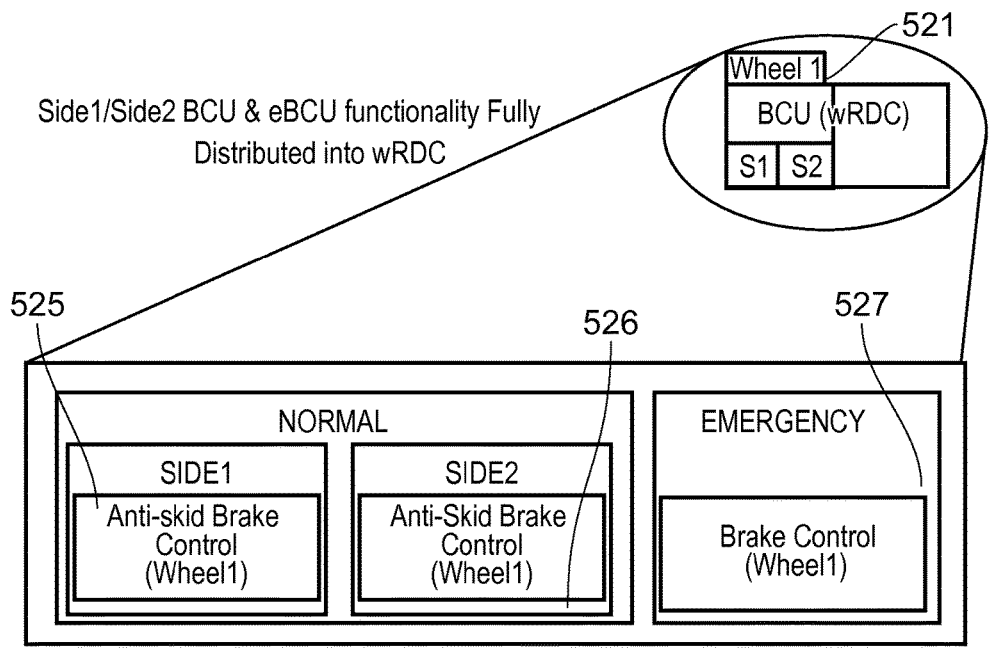
FIG. 22

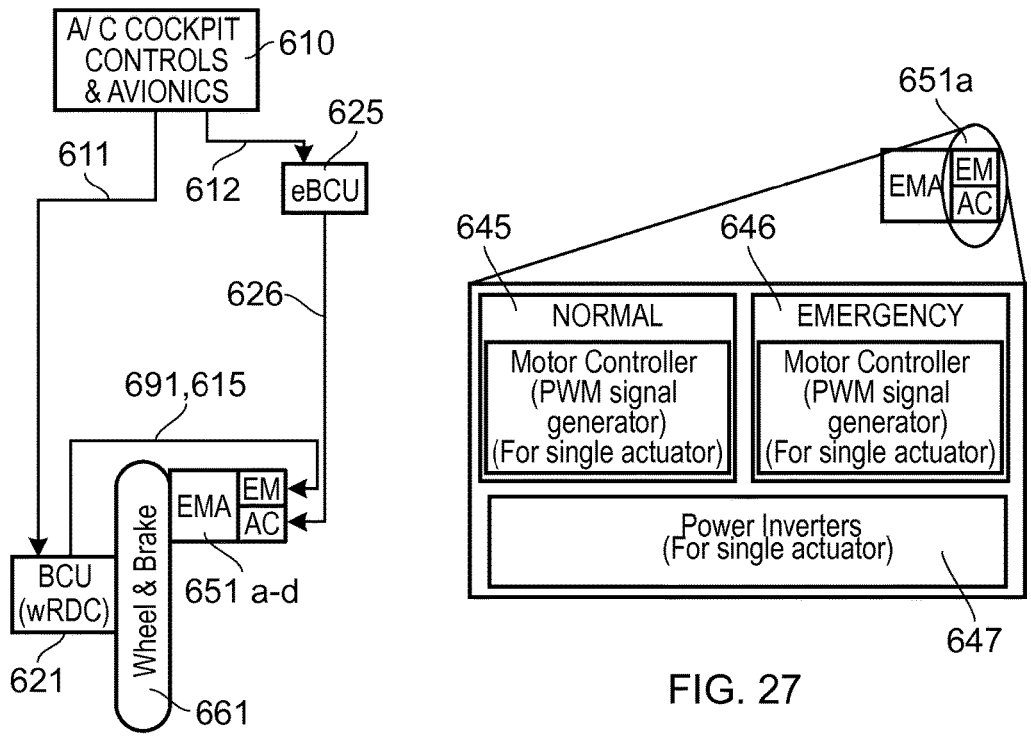
FIG. 26
FIG. 27
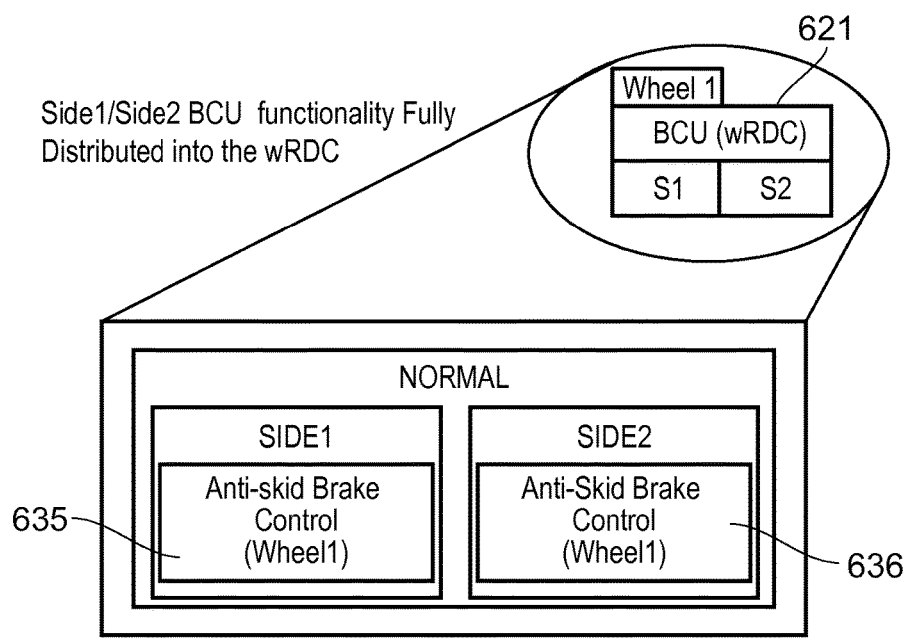
FIG. 28

Table 1

| Functional Block | Description |
|---|---|
| A/C COCKPIT CONTROLS & AVIONICS | A/C Cockpit Controls and Aircraft Avionics |
| BCU | Brake Control Unit |
| BCU (wRDC) or BCU (wRDC) | Brake Control Unit (located in an LRU in close proximity to the wheel) |
| Router | Data Bus Router |
| eBCU | Emergency Brake Control Unit |
| EBPSU | Electric Brake Power Supply Unit |
| EMAC | Electric-Mechanical Actuator Controller |
| sEMAC or sEMAC | Smart Electro-Mechanical Actuator Controller |
| EMA | Electro-Mechanical Actuator |
| EMA EMAC | Smart Electro-Mechanical Actuator |
| EMA EMAC or EMA EMAC or EMA EMAC | Fully Smart Electro Mechanical Actuator |
| Wheel & Brake | Wheel & Brake |

FIG. 34

AIRCRAFT ELECTRIC BRAKING SYSTEM

CROSS-REFERENCE TO RELATED APPLICATION

This application claims priority to GB Application No. 1320938.2, filed 27 Nov. 2013, the entire content of which is hereby incorporated by reference.

FIELD OF THE INVENTION

The present invention relates to an electrically actuated braking system for an aircraft.

BACKGROUND OF THE INVENTION

Electric systems are gradually replacing hydraulic systems on many commercial, and military, aircraft. Current "brake by wire" aircraft systems may have a generally centralised architecture in which pilot inputs are interpreted and command and monitoring signals are communicated via a databus and as analogue/discrete signals to a brake control unit (BCU). An exemplary centralised architecture is described in US 2008/0030069 A1.

The BCU interprets the commands from the aircraft cockpit controls and avionics and calculates braking force commands for each actuated landing gear wheel of the aircraft. This may include fast loop anti-skid control.

Each braking wheel will have at least one electro-mechanical actuator (EMA) for providing a clamping force to the brake for that wheel, which converts the clamping force to a braking torque. Electro-mechanical actuator controllers (EMACs) may be disposed within the landing gear bay and electrically connected to a plurality of brake EMAs coupled to wheel and brake groups. Typically, each wheel and brake group includes a plurality of brake EMAs coupled via a brake assembly to a wheel. The EMACs interpret the brake force commands from the BCU and receive electrical power to provide power to drive the EMAs.

Typically at least two BCUs are provided. The plurality of BCUs may be arranged for redundancy and/or fault tolerance. In a redundant configuration, the BCUs may be assigned to particular sides, e.g. aircraft avionics network side or electrical power network side. The EMACs may therefore receive brake force commands from any BCU. To maximise commonality of parts the EMACs may all be identical so as to minimise the cost and complexity of design, manufacture, installation, repair, replacement, etc. of parts. There is a therefore a potential for simultaneous failure of several EMACs leading to partial or full loss of braking control, which is undesirable. The EMAC may be considered a "complex" part, i.e. it is not fully testable, as defined in ARP4754.

SUMMARY OF THE INVENTION

The invention provides an electrically actuated braking system for an aircraft, comprising: an electro-mechanical brake actuator (EMAbrake) proximate a wheel of the aircraft, the EMAbrake including a motor; an electro-mechanical actuator controller (EMAC) including a first motor controller for generating a first drive signal for the EMAbrake, and a second motor controller for generating a second drive signal for the EMAbrake, wherein the first motor controller and the second motor controller are dissimilar so as to provide protection against common mode failure of the first and second motor controllers.

The first motor controller and the second motor controller may each comprise hardware for generating a pulse-width modulation signal.

The first motor controller and the second motor controller may each comprise a different hardware selected from the group comprising: a microprocessor, a microcontroller, a digital signal processor, an application specific integrated circuit, a programmable logic device, a complex programmable logic device, a field programmable gate array, and a transistor based discrete electronics switching circuit.

The electrically actuated braking system may further comprise a braking control unit (BCU) for generating a braking force command signal for the EMAC during a normal operating mode, and an emergency braking control unit (eBCU) for generating a braking force command signal for the EMAC during an emergency operating mode.

The BCU and/or the eBCU may be disposed together with the EMAC in a common line replaceable unit (LRU), or may be disposed remote from the EMAC.

The BCU, and optionally also the eBCU, may be disposed in a remote data concentrator (RDC) configured for mounting in a wheel or axle region of landing gear of the aircraft.

The EMAC may be disposed together with the EMAbrake in a common line replaceable unit (LRU), or may be disposed remote from the EMAbrake.

The BCU may be operable on a normal brake channel, the eBCU may be operable on an emergency brake channel, the first motor controller may be operable on a normal motor control channel, and the second motor controller may be operable on an emergency motor control channel. The BCU may be configured to communicate with the first motor controller and not the second motor controller, and the eBCU may be configured to communicate with the second motor controller and not the first motor controller.

For example, the normal brake channel and the normal motor control channel may be coupled so as to form a normal channel, and the emergency brake channel and the emergency motor control channel may be coupled so as to form an emergency channel, and the system may further comprise a switch for switching between the normal channel and the and emergency channel.

Alternatively, the BCU may be configured to communicate with either the first motor controller or the second motor controller, and the eBCU may be configured to communicate with either the first motor controller or the second motor controller.

A first switch may be provided for switching between the normal and emergency brake channels, and a second switch may be provided for switching between the normal and emergency motor control channels. The first switch and the second switch may be independently switchable.

A source switch may be operatively coupled between the normal and emergency motor control channels and the EMAbrake for switching the EMAbrake control depending on the selected motor control channel. Alternatively, an OR gate may be operatively coupled between the normal and emergency motor control channels and the EMAbrake for controlling the EMAbrake depending on the operative motor control channel.

The BCU may include redundant brake control channels each for communicating with aircraft cockpit controls and avionics via a respective databus.

The BCU and/or the eBCU may be operable to perform anti-skid brake control.

Also, an aircraft including the electrically actuated braking system above.

BRIEF DESCRIPTION OF THE DRAWINGS

Embodiments of the invention will now be described with reference to the accompanying drawings, in which:

FIG. 10 illustrates a schematic of the smart EMA used in the second embodiment having dissimilar normal and emergency motor controllers, using the same control schemes shown in FIGS. 4 to 7a;

FIG. 20 illustrates a schematic of the control of a single smart EMA of the fifth embodiment;

FIG. 21 illustrates a schematic of the smart EMA used in the fifth embodiment having dissimilar normal and emergency motor controllers;

FIG. 22 illustrates a schematic of the smart wheel/axle RDC featuring BCU and eBCU functionality of the fifth embodiment;

FIG. 26 illustrates a schematic of the control of a single smart EMA of the sixth embodiment;

FIG. 27 illustrates a schematic of the smart EMA used in the fifth embodiment having dissimilar normal and emergency motor controllers;

FIG. 28 illustrates a schematic of the smart wheel/axle RDC featuring BCU functionality of the sixth embodiment;

FIG. 34 shows Table 1 that lists a brief description of the function blocks illustrated in the Figures.

DETAILED DESCRIPTION OF EMBODIMENT(S)

Figure 1:
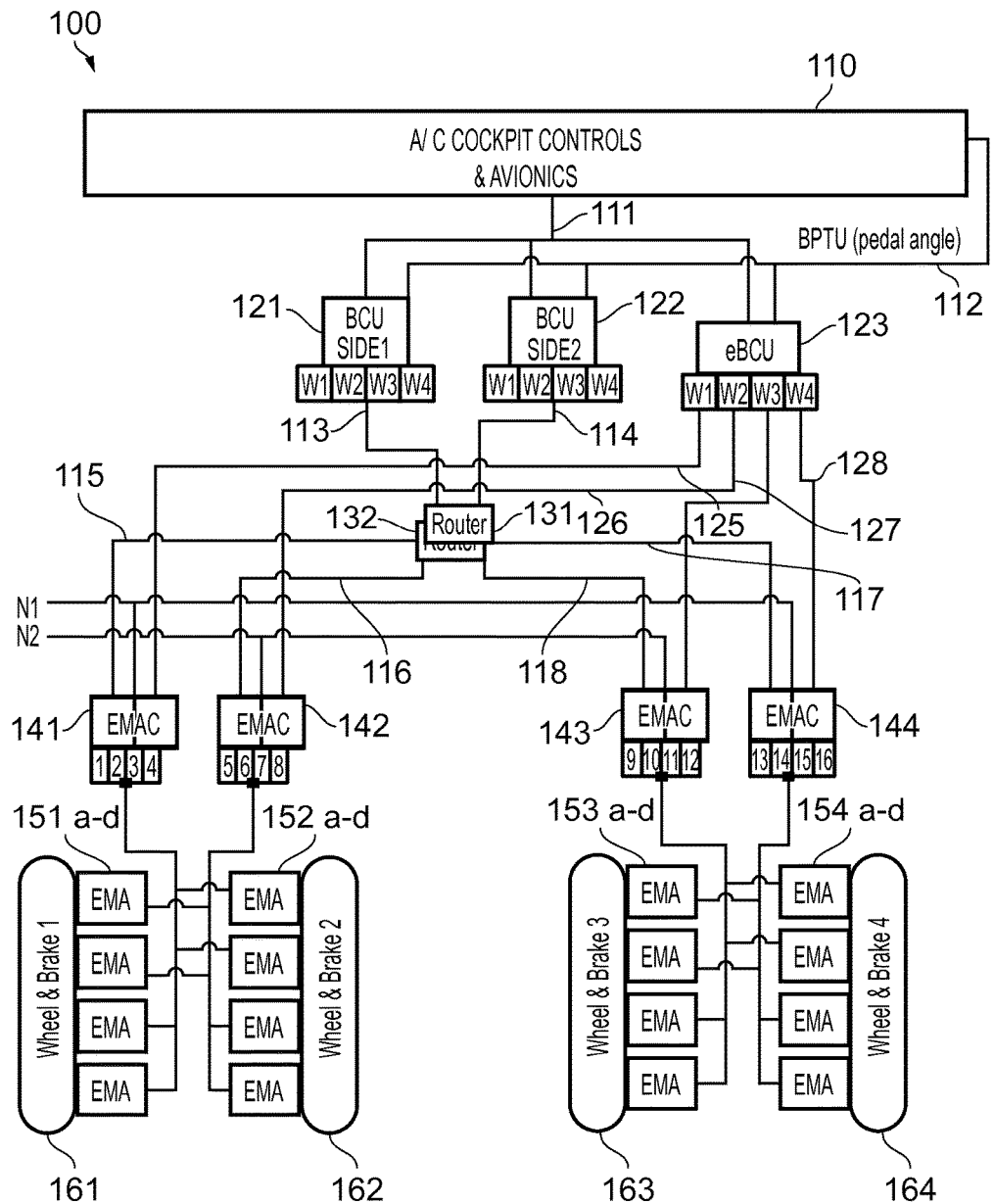
FIG. 1 illustrates a first embodiment of an electrically actuated aircraft braking system featuring centralised avionics.

The electrically actuated aircraft braking system 100 of the first embodiment shown in FIG. 1 is configured for an aircraft having two braked main landing gears, one on either side of the aircraft centre line. However, it will be appreciated that the invention described herein relates to any aircraft configuration having braking wheels, including aircraft with more than two main landing gears and/or braked nose landing gear.

The braking system 100 features centralised avionics. The braking system includes dual redundant brake control units (BCUs) 121, 122 assigned to particular sides, e.g. aircraft avionics network or electrical power network sides (side1, side2, etc.). The BCUs 121, 122 receive input from aircraft cockpit controls and avionics 110 via one or more databuses 111 and analogue and/or discrete signals 112, e.g. from a brake pedal transmitter unit (BPTU) indicating a brake pedal angle. Note that not all signal routes are shown in the figures so as not to obscure the clarity of the description of the invention.

The BCUs 121, 122 interpret signals from the aircraft cockpit controls and avionics 110 and issue braking force commands on a per wheel basis to electromechanical actuator controllers (EMACs) 141, 142, 143, 144. In the aircraft configuration shown in FIG. 1 there are four wheel and brake groups 161, 162, 163, 164, each associated with four electromechanical actuators (EMAs) 151a-d, 152a-d, 153a-

*d*, 154*a*-*d*. Of course, there may be a greater or fewer number of wheel and brake groups or EMAs.

The EMACs 141-144 are coupled via routers 131, 132 to each of the BCUs 121, 122. The routers 131, 132 route digital databus signals from the BCUs to the EMACs (and vice versa) via local databuses 113-118. The EMACs 141-144 interpret brake force commands from the BCUs 121, 122 and receive electrical power from the aircraft power networks N1, N2 (note only the high voltage parts of the aircraft power networks N1, N2 are shown in FIG. 1). The EMACs each include electric braking power supply unit (EBPSU) functionality coupled to the aircraft power network. The EBPSU includes a safety power interlock, and may further include power source switching and/or power conversion, if required. The EMACs 141-144 provide power and control signals to drive the EMAs 151-154.

Each BCU 121, 122 provides brake control signals W1, W2, W3, W4 for each of the wheel and brake groups 161, 162, 163, 164, respectively. The BCUs 121, 122 perform a fast loop anti-skid control for each of the braking wheels of the wheel and brake groups 161-164.

Each EMAC 141-144 is operable to drive four of the EMAs. On the left hand side of the aircraft, including wheel and brake groups 1 and 2, their associated EMACs drive two EMAs of wheel and brake group 1 and two EMAs of wheel and brake group 2, respectively. EMAC 141 drives EMAs 151*c*, 151*d* of wheel and brake group 1 (161) and EMAs 152*a*, 152*b* of wheel and brake group 2 (162). EMAC 142 drives EMAs 151*a*, 151*b* of wheel and brake group 1 (161) and EMAs 152*c*, 152*d* of wheel and brake group 2 (162). Similarly, on the right hand side of the aircraft the two EMACs 143, 144 drive two EMAs of wheel and brake group 3 and two EMAs of wheel and brake group 4, respectively. In an alternative configuration, one EMAC may drive all EMAs of a respective wheel and brake group.

The EMAs 151-154 convert the electrical power into mechanical power to provide clamping force to the brake associated with its respective wheel. The wheel and brake assembly converts the clamping force applied by the EMA into braking torque so as to decelerate or hold stationary the aircraft.

The braking system 100 shown in FIG. 1 comprises both a normal and an emergency system. The aircraft cockpit controls and avionics 110, aircraft databus 111, discrete signals 112, EMACs 141-144, EMAs 151-154, and wheel and brake groups 161-164 are common to both normal and emergency braking systems. As discussed above, the normal braking system comprises the data routers 131, 132 and BCUs 121, 122 plus the shared equipment described above. The emergency system comprises an emergency BCU (eBCU) 123 which is coupled between the aircraft cockpit controls and avionics 110 and the four EMACs 141-144, plus the shared equipment described above. The eBCU 123 receives input from aircraft cockpit controls and avionics via analogue and/or discrete signals, e.g. from a brake pedal transmitter (BPTU) indicating a brake pedal angle.

The eBCU 123 provides protection against loss of function of both BCUs 121, 122, e.g. from failure of the BCUs, failure of the A/C avionics, failure of the communications databus, or failure of a power supply (depending on the power supply configuration)—all of which could lead to a loss of function for the BCU. The eBCU 123 outputs brake control signals W1, W2, W3, W4 for each of the wheel and brake groups 161, 162, 163, 164, respectively via analogue and/or discrete routes 125-128 to the EMACs 141-144. In an alternative configuration routes 112 and 125-128 may be digital databuses. The eBCU 123 is operable to perform the same functions as the BCUs 121, 122 but is in use only when the system is in emergency mode. The eBCU 123 may comprise simpler technology, or may receive and output analogue signals only depending on the architecture. The eBCU 123 preferably performs fast loop anti-skid control for each of the braking wheels of the wheel and brake groups 161-164. The eBCU may be based upon dissimilar technology to the BCU for protection against common mode failures.

Each EMAC 141-144 includes a primary, or first, motor controller for driving the motor within each EMA 151-154 with which it is associated. To protect against the eventuality of a simultaneous failure of the motor controllers in the normal channel of each EMAC 141-144, due to a common mode failure at actuator control level, each EMAC further comprises a secondary, or second, motor controller. The primary motor controller forms part of a normal channel of the EMAC, and the secondary motor controller forms part of an emergency channel of the EMAC. The motor controller is the complex part of the EMAC, and so a dissimilar motor controller is incorporated within the EMAC to form part of the emergency channel.

Figure 2:
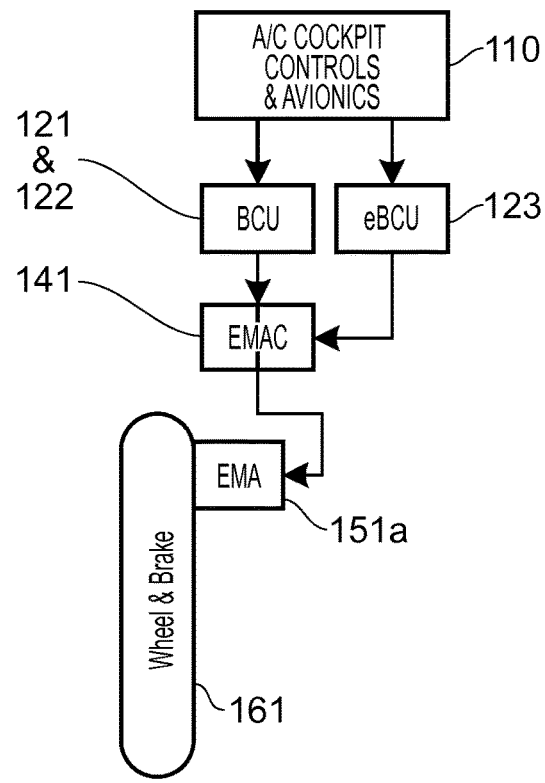
FIG. 2 illustrates a schematic of the control of a single EMA of the first embodiment.

FIG. 2 illustrates a schematic of the control of a single EMA 151*a* in the first embodiment in which the EMAC 141 is operable to receive brake force commands on a per wheel basis from either of the BCUs 121, 122 or the eBCU 123. The EMAC 141 interprets the brake force commands and receives electrical power to then provide power to drive the EMA 151*a*. The EMAC also receives feedback signals from the motor of the EMA.

Figure 3:
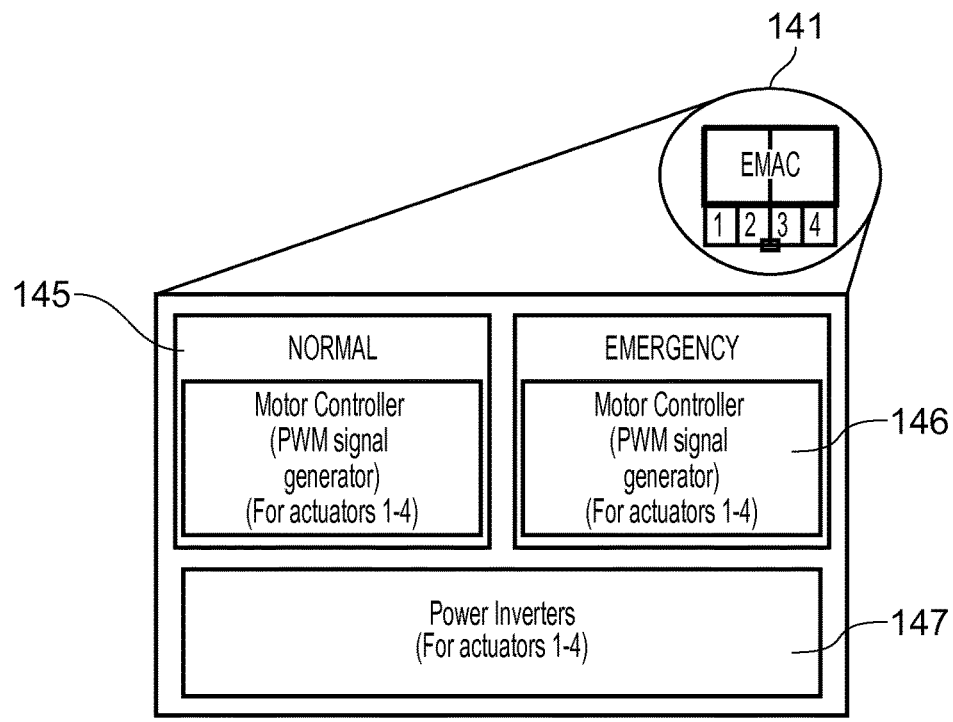
FIG. 3 illustrates a schematic of the EMAC used in the first embodiment having dissimilar normal and emergency motor controllers.

FIG. 3 illustrates schematically two dissimilar motor control paths within the EMAC 141. The EMAC includes a normal (primary) motor controller 145 which is a pulse-width modulation (PWM) signal generator its four associated EMAs (151*a*, 151*b*, 152*c*, 152*d*). The EMAC also includes an emergency (secondary) motor controller 146 which is a PWM signal generator for its four EMAs. The EMAC also includes a power inverter 147 for its four EMAs.

Figure 4:
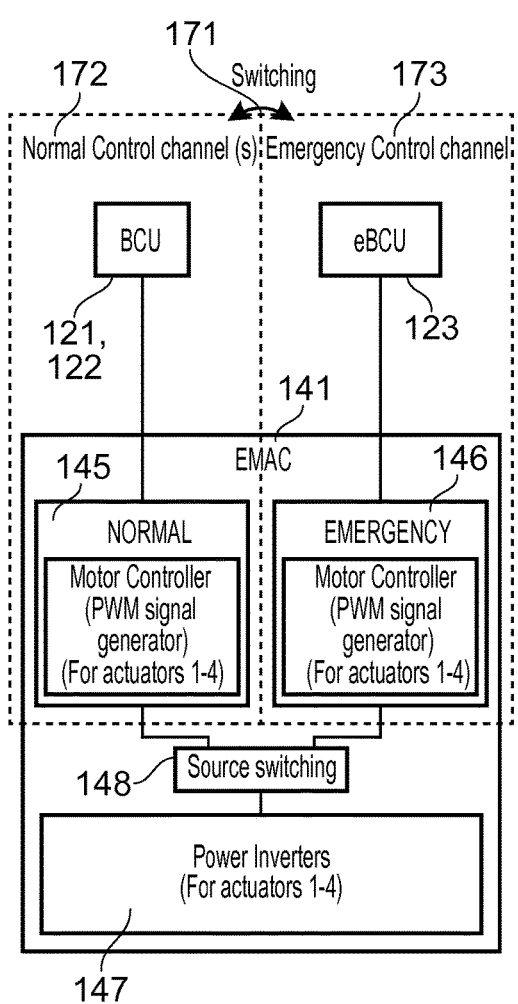
FIG. 4 illustrates a first example of a control scheme for the EMAC shown in FIG. 3.

FIG. 4 illustrates a first example of a control scheme for the EMAC 141 shown in FIG. 3. In this configuration the braking system control is switched 171 unitarily between normal 172 and emergency 173 channels such that the when the brake control channel is switched from the normal channel (though the BCU 121/122) to the emergency channel (through the eBCU 123) the motor control channel is also switched from the normal channel (through the EMAC primary motor controller 145) to the emergency channel (through the EMAC secondary motor controller 146). In this way the normal brake control channel always communicates with the normal motor control channel, and the emergency brake control channel always communicates with the emergency motor control channel.

As shown in FIG. 4 the EMAC further includes a source switch 148 for switching between the normal and emergency channels as both channels may be continuously transmitting. In a simplified arrangement an OR gate may be used in place of the source switch 148 if the control channels are not continuously transmitting.

Operation of the braking system 100 will now be described. During normal braking system operation when the pilot, co-pilot, autopilot, etc. operates the cockpit braking control cockpit signals, such as the brake pedal angle, are interpreted by the aircraft avionics at 110 and command and monitoring signals are sent to the side1 and side2 BCUs 121, 122. Discrete signals are also sent to the EBPSU hardware enable within the EMACs 141-144. The EBPSU hardware enable within the EMACs receives the braking enable signal from the aircraft cockpit controls 110 and allows high voltage power from the aircraft power network to be supplied to the power inverter stage 147 within the EMACs.

Either side1 or side2 BCUs 121, 122 compute the brake force required based upon the command signal received from the aircraft avionics and (if available) performs anti-skid computation based upon wheel speeds, before sending a modified braking force command to the normal motor control channel 145 within the EMACs. The normal motor control channel within the EMAC receives the brake force command from the BCUs and (based upon a determination of which BCU is currently active) computes a PWM signal which is sent to the power inverter stage 147 within the EMAC. The power inverter stage uses the PWM signal to modulate the power supply to the respective EMAs 151a-d, 152a-d, 153a-d, 154a-d. The EMAs receive the electrical power from the EMACs and produce a clamping force on the respective brakes in order to decelerate or hold stationary the aircraft.

In the case of a failure in one of the BCUs 121, 122 the system is operable to switch sides to the other active BCU 121, 122.

During emergency operation of the braking system two separate cockpit signals are sent via either analogue or digital means to the eBCU 123 and to the EBPSU hardware enable within the EMACs 141-144. The EBPSU hardware enable receives the braking enable signal and allows high voltage power to be supplied to the power inverter stage 147 within the EMACs. The eBCU 123 computes the braking force required based upon the command signal received from the aircraft avionics and (if available) performs anti-skid computation based upon wheel speeds, before sending a modified braking force command to the emergency motor control channel 146 within the EMACs. The emergency motor control channel within the EMAC receives the brake force command from the eBCU and computes a PWM signal which is sent to the power inverter stage 147 within the EMAC. The power inverter stage uses the PWM signal to modulate the power supply to the respective EMAs 151a-d, 152a-d, 153a-d, 154a-d. The EMAs receive the electrical power from the EMACs and produce a clamping force on the respective brakes in order to decelerate or hold stationary the aircraft.

Figure 5:
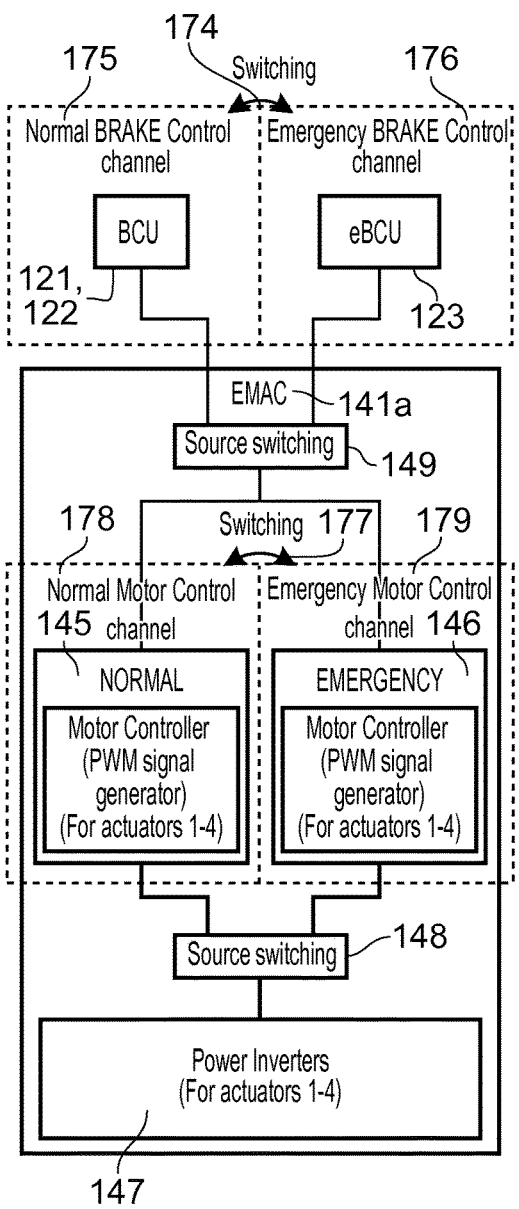
FIG. 5 illustrates a second example of a control scheme for the EMAC shown in FIG. 3.

FIG. 5 illustrates a second example of a control scheme for the EMAC shown in FIG. 3. In this configuration the active brake control channel of the BCU/eBCU and the active motor control channel of the EMAC 141a may be switched independently depending on failure conditions. Therefore the normal brake control channel (though the BCU 121/122) may communicate with either the normal motor channel (through the EMAC primary motor controller 145) or the emergency motor channel (through the EMAC secondary motor controller 146). Similarly, the emergency brake control channel (though the eBCU 123) may communicate with either the normal motor channel (through the EMAC primary motor controller 145) or the emergency motor channel (through the EMAC secondary motor controller 146).

Unlike the FIG. 4 control scheme, in FIG. 5 the brake channel control is switched 174 between normal (BCU) 172 and emergency (eBCU) 173 channels, and the source switch 148 is arranged to switch between the outputs from the normal and emergency motor controllers 145, 146. The EMAC 141a further includes a source switch 149 for switching 177 the brake control received from either the BCU 121, 122 or the eBCU 123 to either the normal motor control channel 178 or the emergency motor control channel 179. In a simplified arrangement an OR gate may be used in place of the source switch 148 if the control channels are not continuously transmitting.

Figure 6:
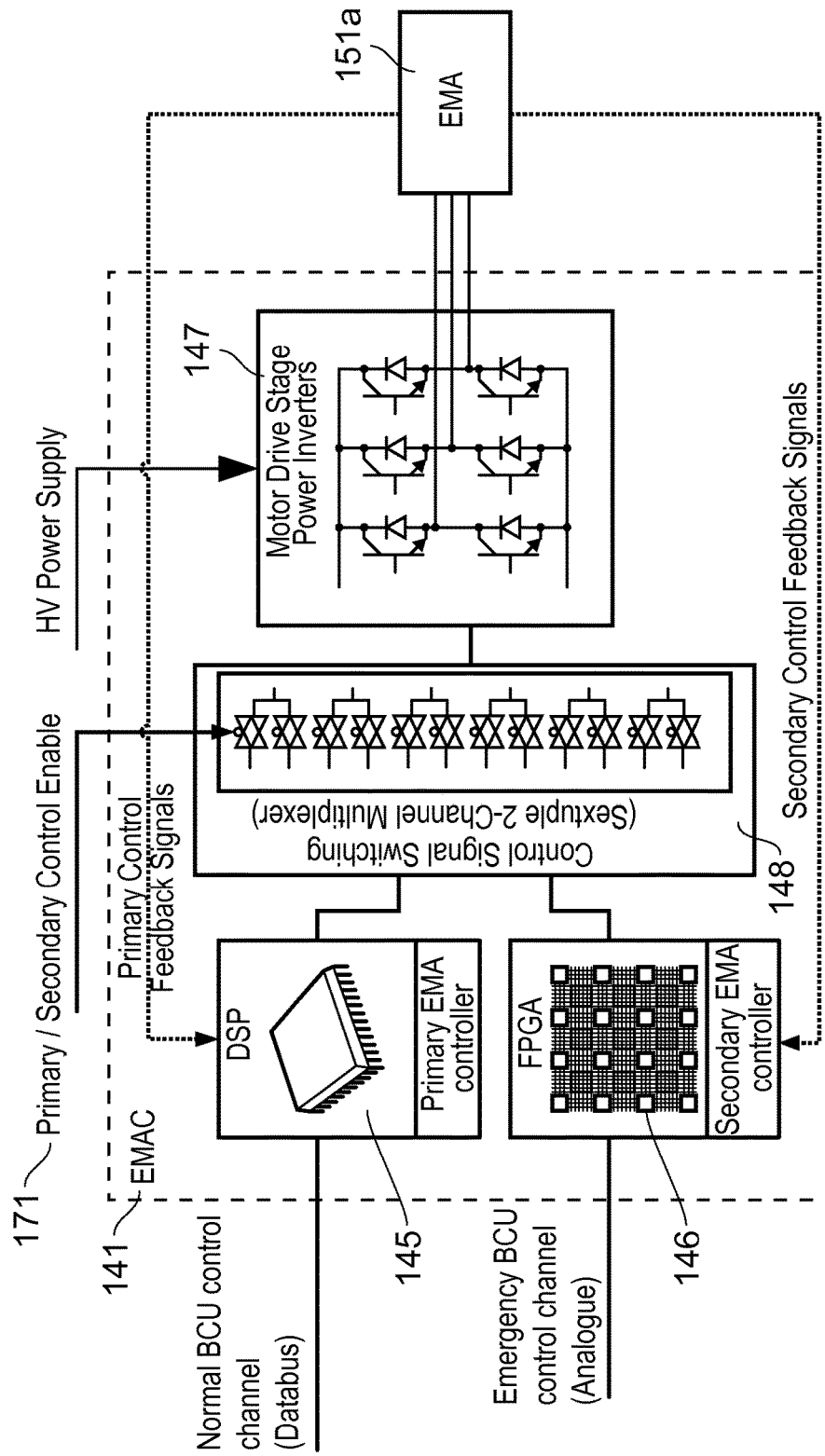
FIG. 6 illustrates in detail the dissimilar motor controllers used in the first example EMAC of FIG. 4.

FIG. 6 illustrates in detail one exemplary embodiment of the dissimilar motor controllers which may be used in the first example EMAC 141 of FIG. 4. The primary (normal) motor controller (PWM signal generator) 145 is a digital signal processor (DSP), and the secondary (emergency) motor controller (PWM signal generator) 146 is a field programmable gate array (FPGA). The source switch 148 is a sextuple 2-channel multiplexer. Feedback signals from the EMA 151a are directed to the primary and secondary controllers 145, 146.

Figure 6A:
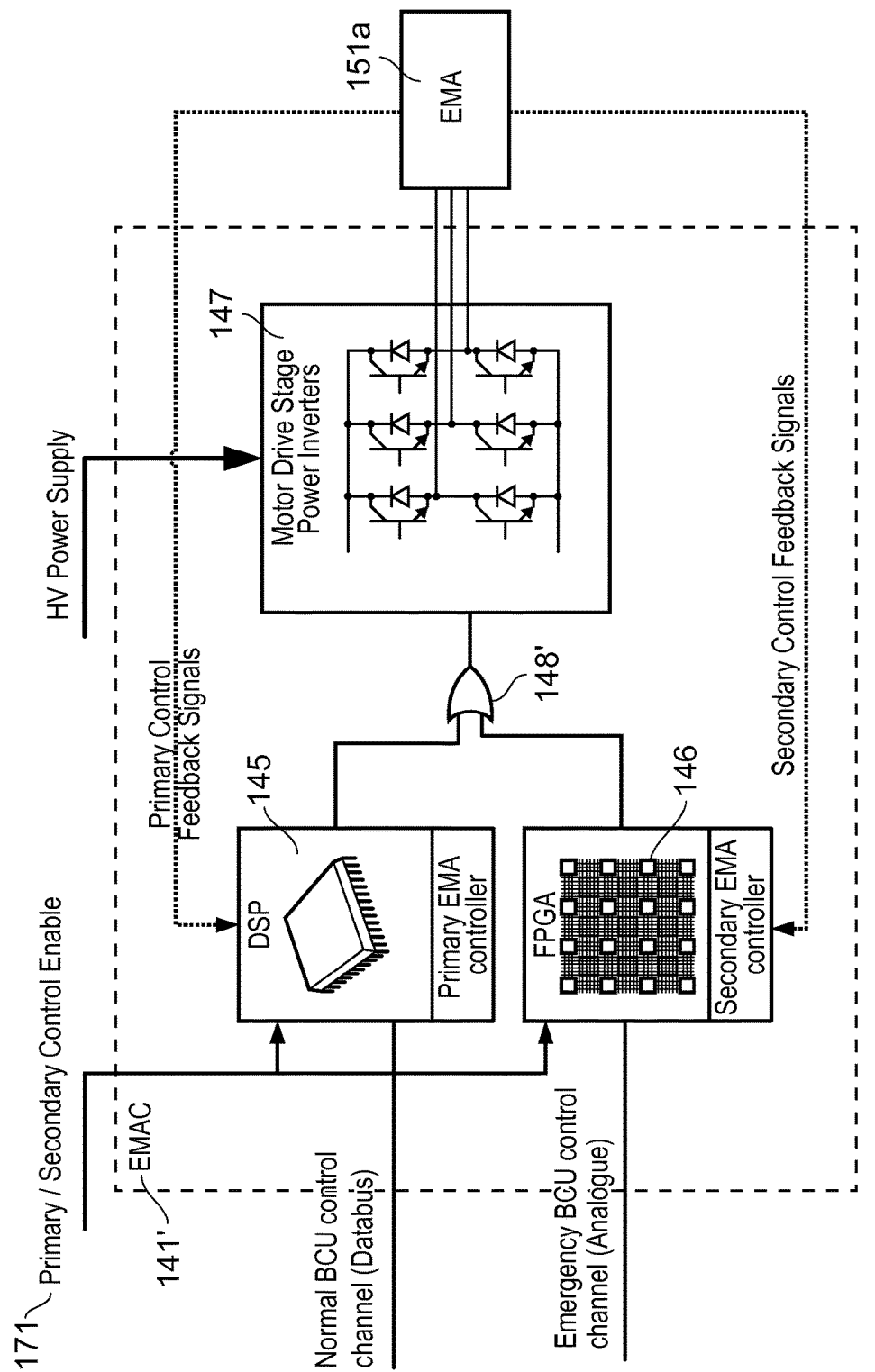
FIG. 6a illustrates in detail an alternative arrangement of the dissimilar motor controllers used in the first example EMAC of FIG. 4.

FIG. 6a illustrates an alternative EMAC 141' similar to FIG. 6 but in which the source switch 148 has been replaced by an OR gate 148', as described above. In all other respects the EMAC 141' is identical to that shown in FIG. 6.

Figure 7:
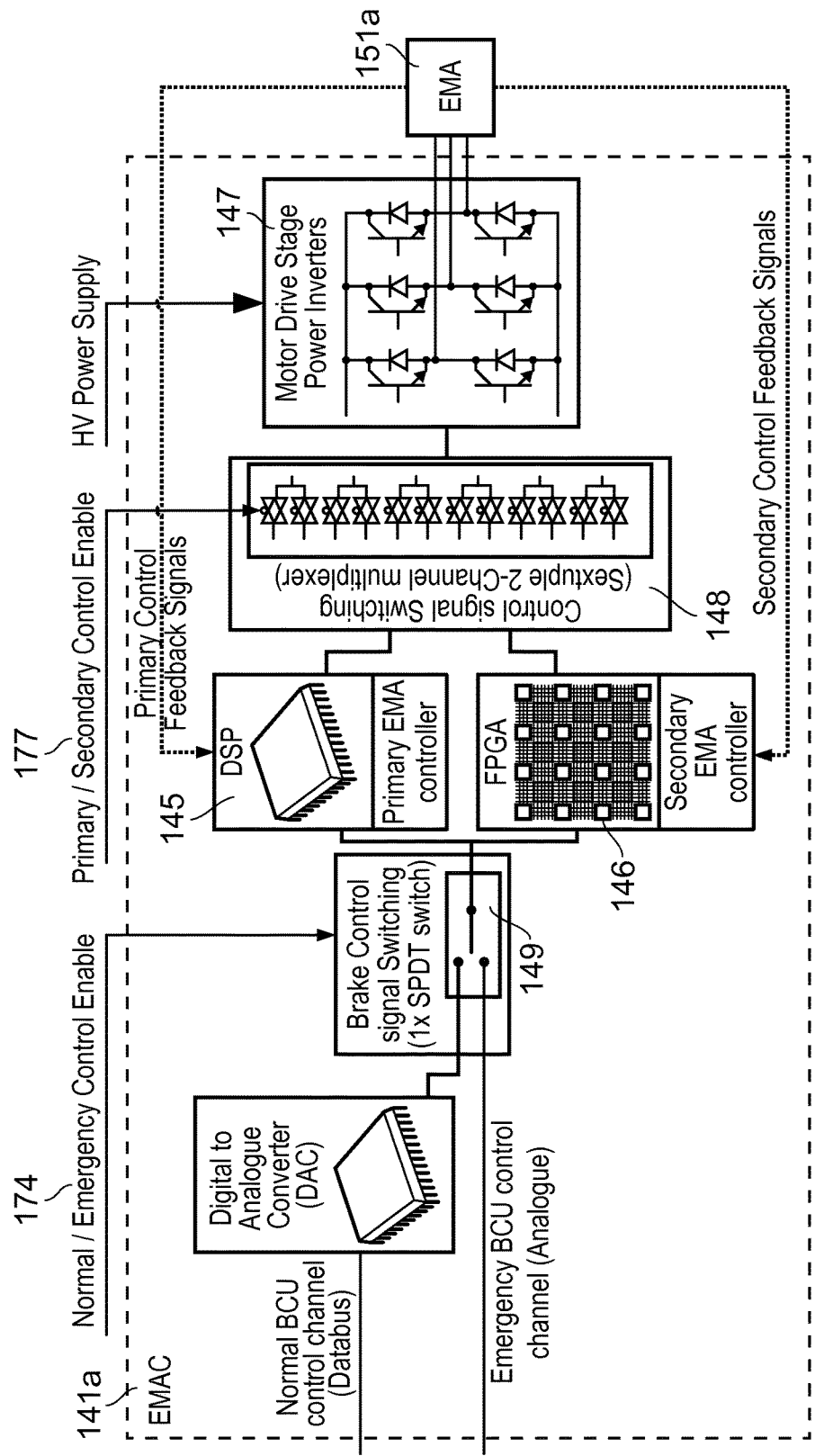
FIG. 7 illustrates in detail the dissimilar motor controllers used in the second example EMAC of FIG. 5.

FIG. 7 illustrates an EMAC 141a for use in the second example control scheme of FIG. 5. The normal/emergency brake channel switching 174 is effected by source switch 149, whilst the normal/emergency (primary/secondary) motor control channel switching 177 is effected by source switch 148.

Figure 7A:
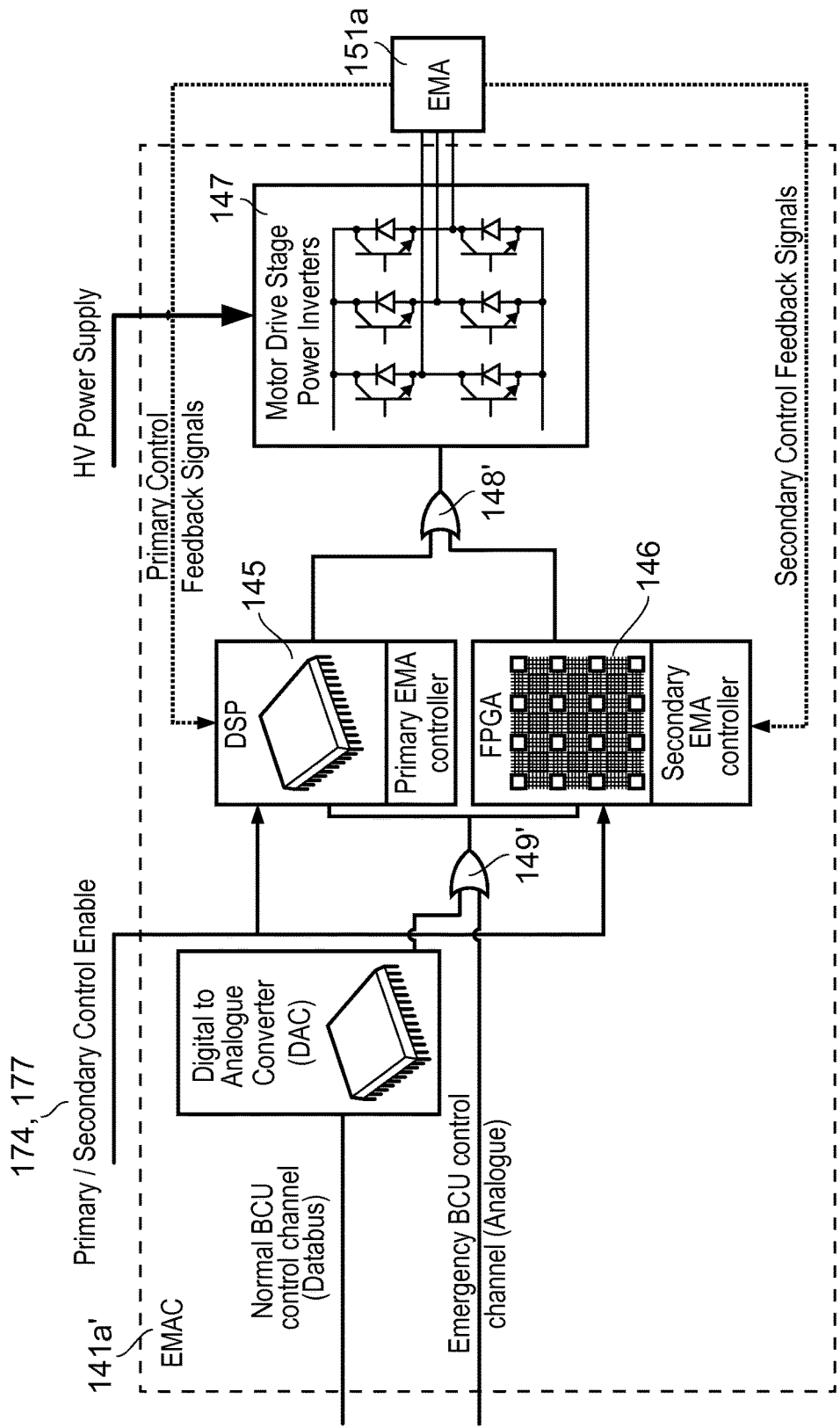
FIG. 7a illustrates in detail an alternative arrangement of the dissimilar motor controllers used in the second example EMAC of FIG. 5.

FIG. 7a illustrates an alternative EMAC 141a' similar to FIG. 7 but in which the source switches 148, 149 have been replaced by OR gates 148', 149', as described above, and the brake and motor control channel switching is provided by primary/secondary control enable 174, 177. In all other respects the EMAC 141' is identical to that shown in FIG. 7.

Whilst in FIG. 6-7a dissimilar technologies are used for the motor controllers 145, 146 the choice of DSP and FPGA should not be construed as limiting. A variety of hardware for PWM signal generating purposes are known including, but not limited to, processor based technologies such as microprocessors, microcontrollers and DSPs; logic based devices such as ASIC (application specified integrated circuits), PLD (programmable logic devices), CPLD (complex programmable logic devices) and FPGAs; and discrete electronics such as transistor based switching circuits for example. Any combination of two dissimilar technologies may be selected for the two different motor controllers of the EMAC.

Figure 8:
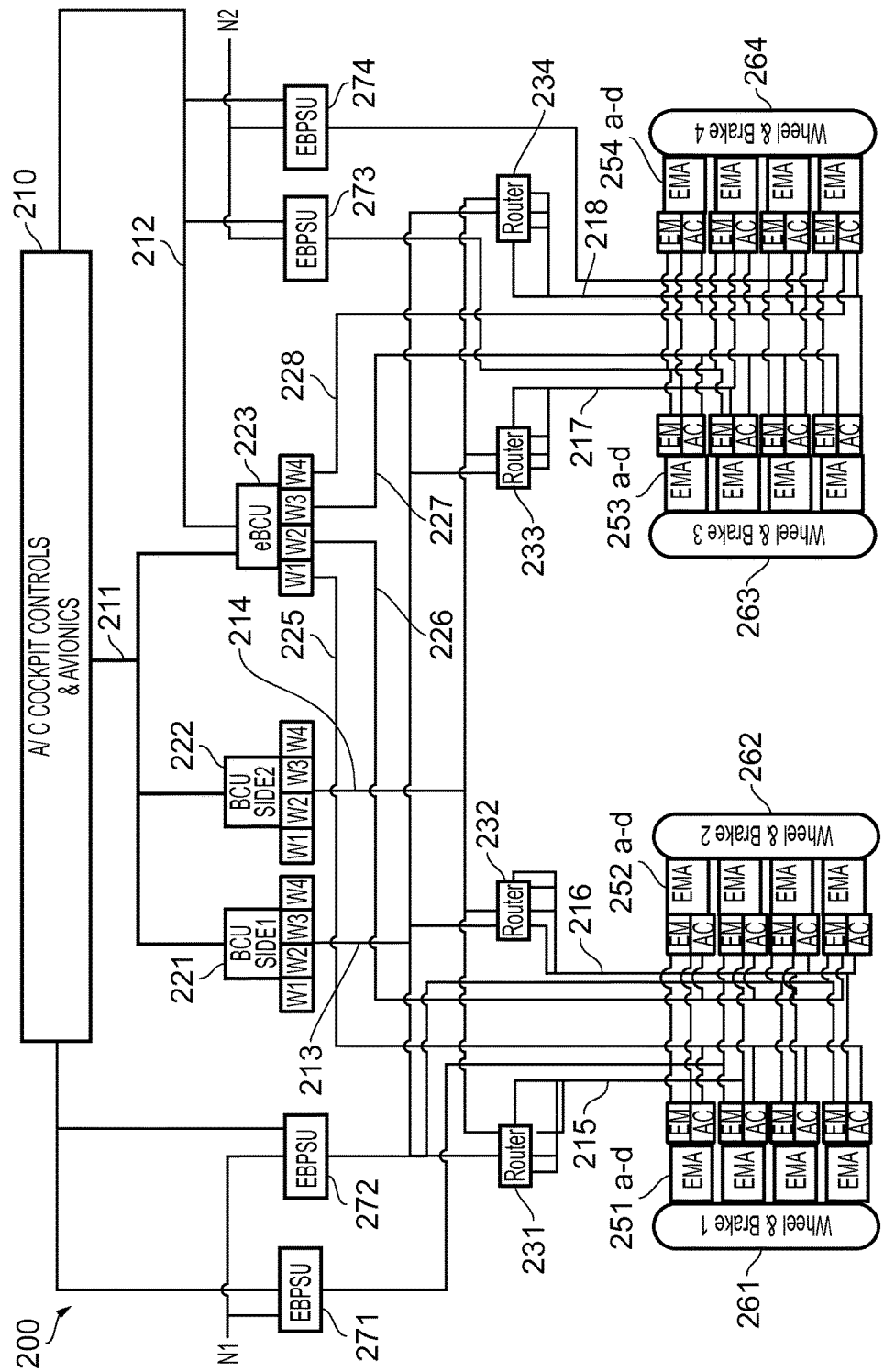
FIG. 8 illustrates a second embodiment of an electrically actuated aircraft braking system featuring centralised avionics, and "smart" EMAs.

FIG. 8 illustrates a second embodiment of an electrically actuated aircraft braking system 200 featuring centralised avionics, and "smart" EMAs. The braking system 200 shares many similarities with the system 100 of FIGS. 1-7 and includes the following key differences. In place of the EMAs and remote EMACs of the system 100, the system 200 includes "smart" EMAs in which the normal and emergency EMAC functionality is packaged within the EMA in a single line replaceable unit (LRU). EBPSU functionality is not distributed into the EMACs, instead separate LRU EBPSUs are provided—as EBPSU functionality would need to be duplicated 16 times one for each smart EMA LRU otherwise, although this may of course be used.

The braking system 200 includes side1 and side2 BCUs 221, 222, which receive input from aircraft cockpit controls and avionics 210 via databus 211. The BCUs 221, 222 interpret signals from the aircraft cockpit controls and avionics 210 and issue braking force commands on a per wheel basis to smart EMAs 251a-d, 252a-d, 253a-d, and 254a-d, each incorporating a respective EMAC. The four wheel and brake groups 261-264 are each associated with groups of four smart EMAs 251a-d, 252a-d, 253a-d, 254a-d respectively.

The smart EMAs 251a-d, 252a-d, 253a-d, 254a-d are coupled via routers 231-234 to each of the BCUs 221, 222. The routers 231, 232 route digital databus signals from the BCUs to the smart EMAs via local databuses 213-218. The smart EMAs 251a-d, 252a-d, 253a-d, 254a-d interpret brake force commands from the BCUs 231, 232 and receive electrical power via EBPSUs 271-274 from the aircraft power network via power routes N1, N2.

Each BCU 221, 222 provides brake control signals W1, W2, W3, W4 for each of the wheel and brake groups 261, 262, 263, 264, respectively. The BCUs 221, 222 perform a fast loop anti-skid control for each of the braking wheels of the wheel and brake groups 261-264.

The smart EMAs 141-144 251a-d, 252a-d, 253a-d, 254a-d convert the electrical power into mechanical power to provide clamping force to the brake associated with its respective wheel, as in the previous embodiment.

The braking system 200 shown in FIG. 8 comprises both a normal and an emergency system. The aircraft cockpit controls and avionics 210, aircraft databus 211, smart EMAs 251-254, and wheel and brake groups 261-264 are common to both normal and emergency braking systems. The normal braking system additionally comprises the data routers 231-234 and BCUs 221, 222. The emergency braking system additionally comprises eBCU 223 which is coupled between the aircraft cockpit controls 210 via analogue/discrete routes 212 (or databuses) and the sixteen smart EMAs 251-254.

The eBCU 223 provides protection against loss of function of both BCUs 221, 222 as in the first embodiment. The eBCU 223 outputs brake control signals W1, W2, W3, W4 for each of the four wheel and brake groups 261, 262, 263, 264, respectively via analogue/discrete routes 225-228 to the four groups of smart EMAs 251-254. The eBCU 223 performs the same functions as the eBCU 123 described above.

Each smart EMA 251-254 includes a primary, or first, motor controller for driving its integrated EMA motor. To protect against the eventuality of a simultaneous failure of the motor controllers in the normal channel of each smart EMA, due to a common mode failure at actuator control level, each smart EMA further comprises a secondary, or second, motor controller. The primary motor controller forms part of a normal channel of the EMAC, and the secondary motor controller forms part of an emergency channel of the EMAC. The motor controller of the EMAC is the complex part of the smart EMA, and so a dissimilar motor controller is incorporated within the smart EMA to form part of the emergency channel.

Figure 9:
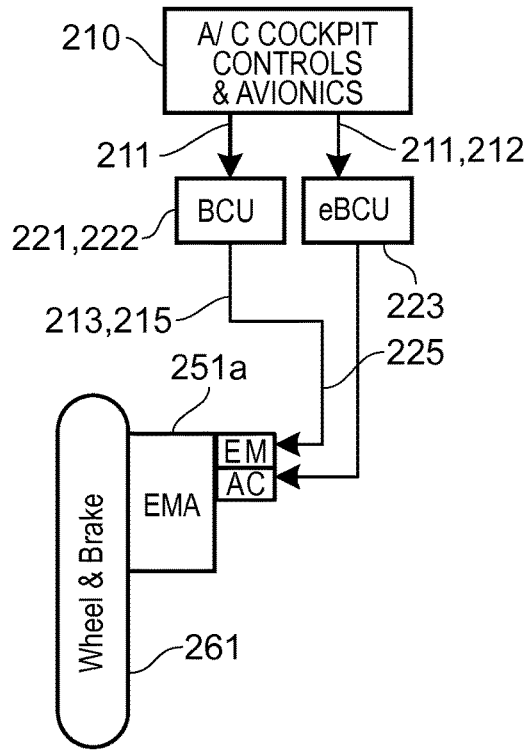
FIG. 9 illustrates a schematic of the control of a single smart EMA of the second embodiment.

FIG. 9 illustrates a schematic of the control of a single smart EMA 251a in the second embodiment in which the smart EMA is operable to receive brake force commands on a per wheel basis from either of the BCUs 221, 222 or the eBCU 223. The smart EMA 251a interprets the brake force commands and receives electrical power from the EBPSU 271 (not shown in FIG. 9) to then provide power to drive the motor of the smart EMA.

Figure 10:
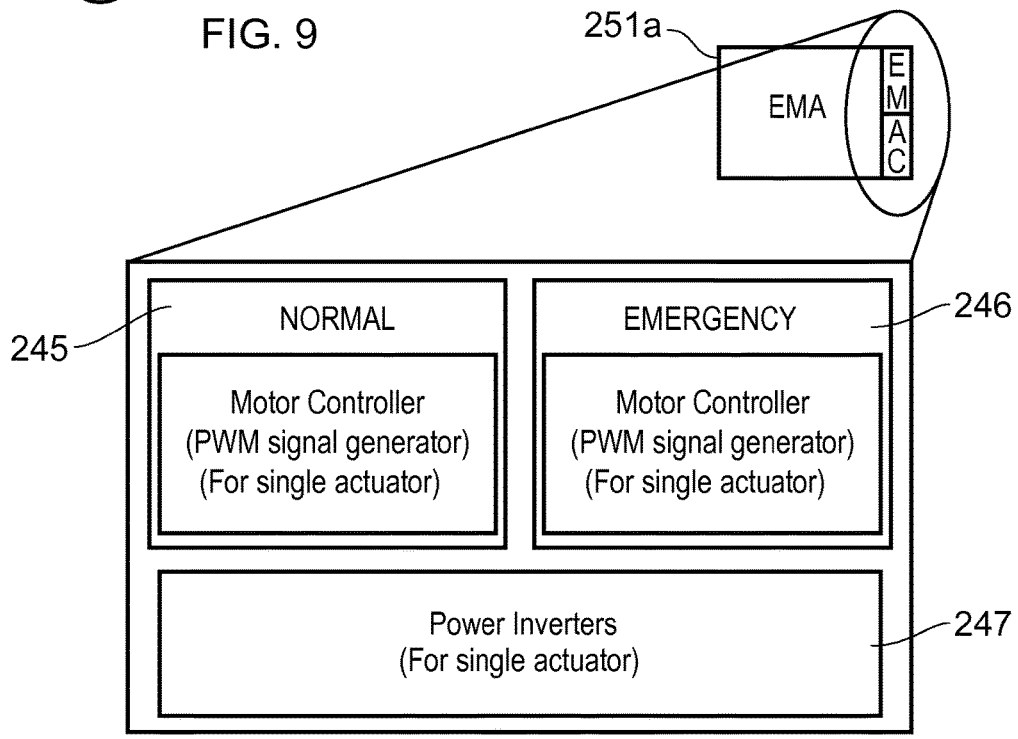

FIG. 10 illustrates schematically two dissimilar motor control paths within the smart EMA 251a. The smart EMA includes a normal (primary) motor controller 245, an emergency (secondary) motor controller 246 similar to the controllers 145, 146 of the system 100, and a power inverter 247 for its motor.

The EMAC functionality of the smart EMAs may be configured in the same way as described above with reference to FIGS. 4 to 7. Operation of the braking system 200 may be carried out similar to that described above with reference to the braking system 100, with the difference that the EBPSU functionality is in a separate LRU to the EMACs, and the EMAC functionality is integrated with the EMAs in a common LRU.

Figure 11:
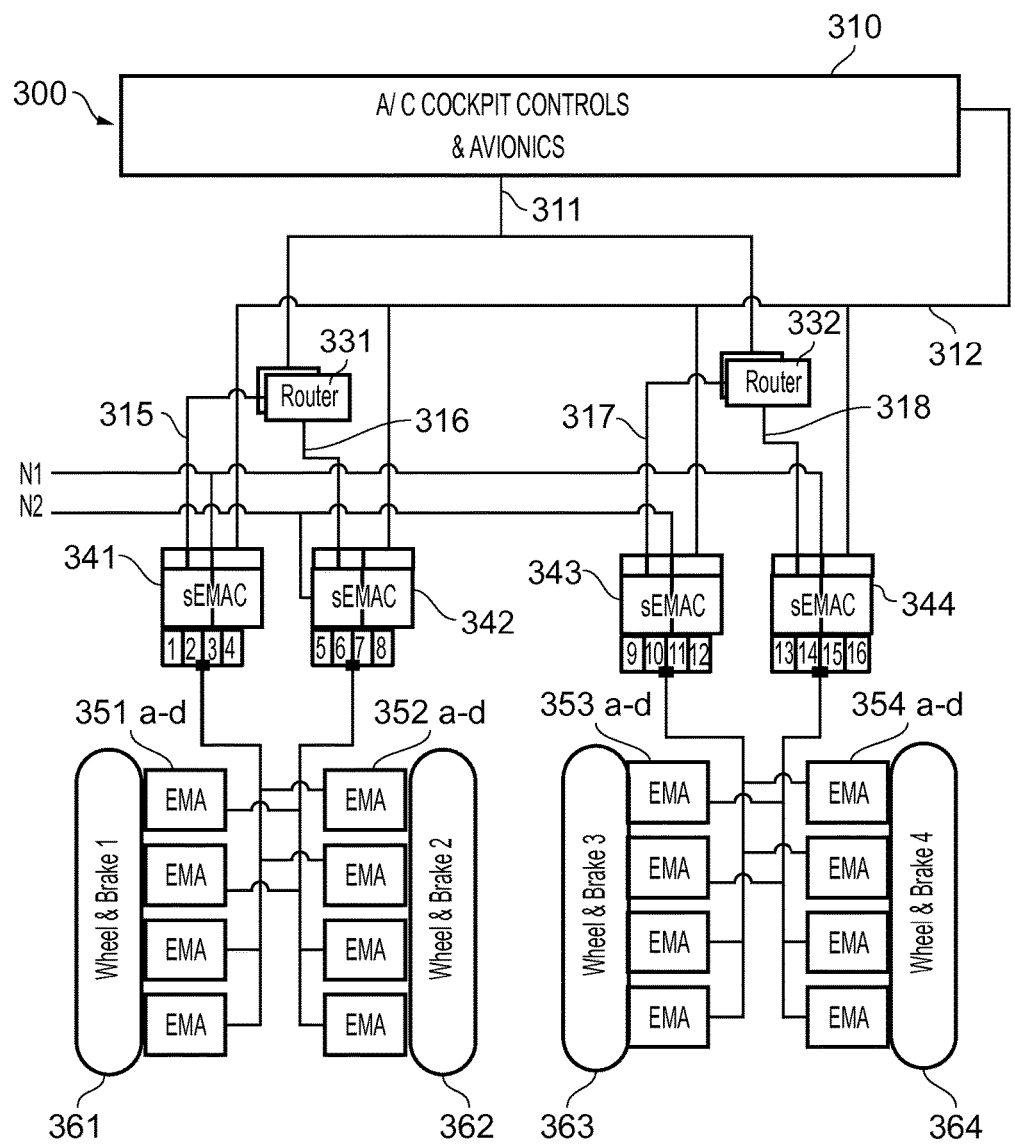
FIG. 11 illustrates a third embodiment of an electrically actuated aircraft braking system featuring distributed avionics, with "smart" EMACs.

FIG. 11 illustrates a third embodiment of an electrically actuated aircraft braking system 300 featuring distributed avionics, with "smart" EMACs. The braking system 300 shares many similarities with the system 100 of FIG. 1 and includes the following key differences. In place of the BCUs/eBCU and remote EMACs of the system 100, the system 300 includes "smart" EMACs in which the side1 BCU, side2 BCU and eBCU functionality is packaged within the EMAC in a single line replaceable unit (LRU). The avionics are therefore no longer centralised, but (partially) distributed.

The braking system 300 includes four smart EMACs 341-344. The smart EMACs 341-344 receive input from aircraft cockpit controls and avionics 310 via databus 311 and analogue/discrete signals 312, e.g. from a brake pedal transmitter unit (BPTU) indicating a brake pedal angle. Routers 331, 332 route digital databus signals from the aircraft cockpit controls and avionics 310 to the smart EMACs via local databuses 315-318. The smart EMACs 341-344 receive electrical power from the aircraft power network via power routes N1, N2.

The smart EMACs 341-344 perform all of the same functions of the EMACs of the system 100 and additionally all of the same functions of the BCUs/eBCU of the system 100.

As with the system 100, the system 300 includes four wheel and brake groups 361-364, each associated with four electromechanical actuators (EMAs) 351a-d, 352a-d, 353a-d, 354a-d. The EMAs perform all of the same functions as the EMAs of the system 100.

The braking system 300 comprises both a normal and an emergency system. Each smart EMAC 341-344 includes a primary, or first, motor controller for driving the motor within each EMA 351-354 with which it is associated. To protect against the eventuality of a simultaneous failure of the motor controllers in the normal channel of each smart EMAC 341-344, due to a common mode failure at actuator control level, each smart EMAC further comprises a secondary, or second, motor controller. The primary motor controller forms part of a normal channel of the braking system, and the secondary motor controller forms part of an emergency channel of the braking system. The motor controller is the complex part of the smart EMAC, and so a dissimilar motor controller is incorporated within the smart EMAC to form part of the emergency channel.

Figure 12:
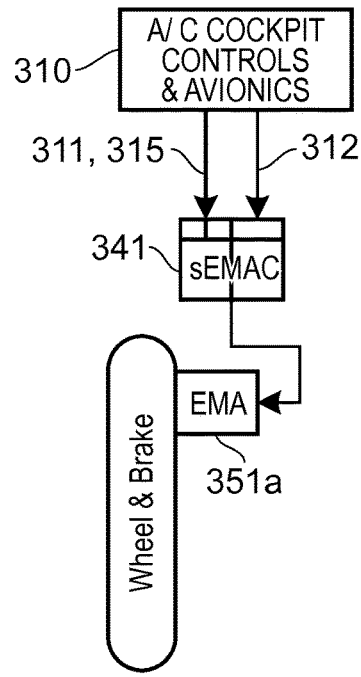
FIG. 12 illustrates a schematic of the control of a single EMA of the third embodiment.

FIG. 12 illustrates a schematic of the control of a single EMA 151a in the third embodiment in which the smart EMAC 341 is operable to compute brake force commands on a per wheel basis based on the databus 311, 315 and discrete 312 signals from the aircraft cockpit control and avionics 310. The smart EMAC 341 also receives electrical power to then provide power to drive the EMA 351a.

Figure 13:
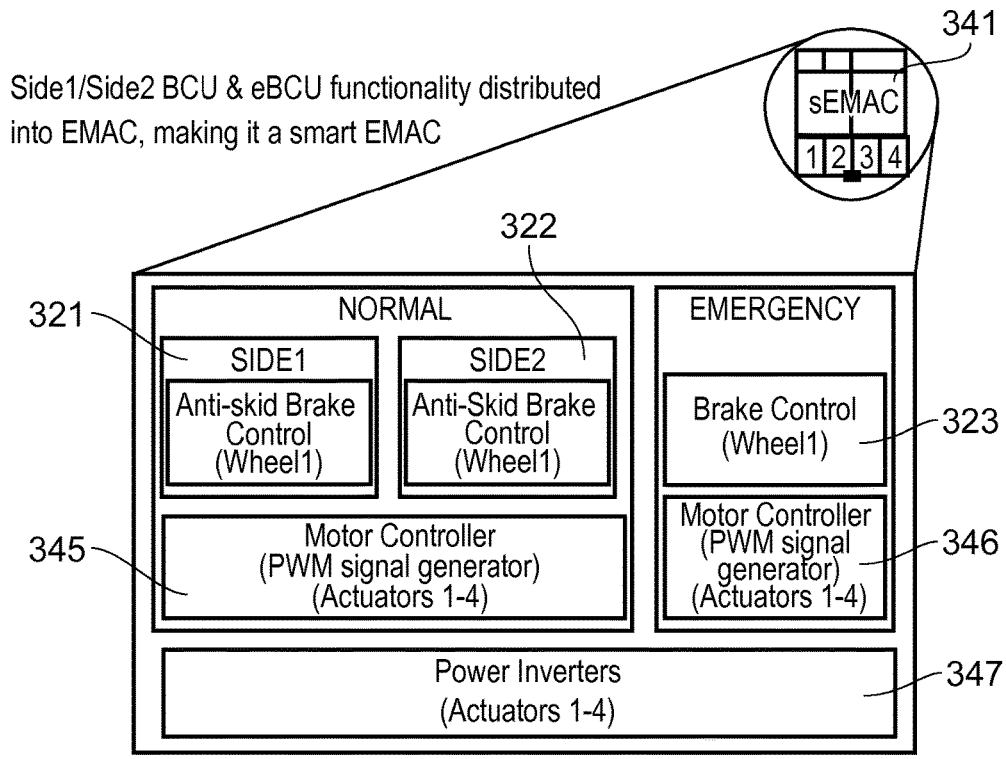
FIG. 13 illustrates a schematic of the "smart" EMAC used in the third embodiment having dissimilar normal and emergency motor controllers and integrated BCU and eBCU functionality.

FIG. 13 illustrates schematically the normal and emergency channels within the smart EMAC 341. In the normal channel, the smart EMAC includes a side1 BCU function block 321, a side2 BCU function block 322, and a normal (primary) motor controller 345 which is a pulse-width modulation (PWM) signal generator for its four associated EMAs. In the emergency channel, the smart EMAC includes an eBCU function block 323 and an emergency (secondary) motor controller 346 which is a PWM signal generator for its four EMAs. The EMAC also includes a power inverter 347 for its four EMAs. The side1 and side 2 BCU function blocks 321, 322 include fast-loop anti skid control. The eBCU function block may or may not also include fast-loop anti skid control.

Figure 14:
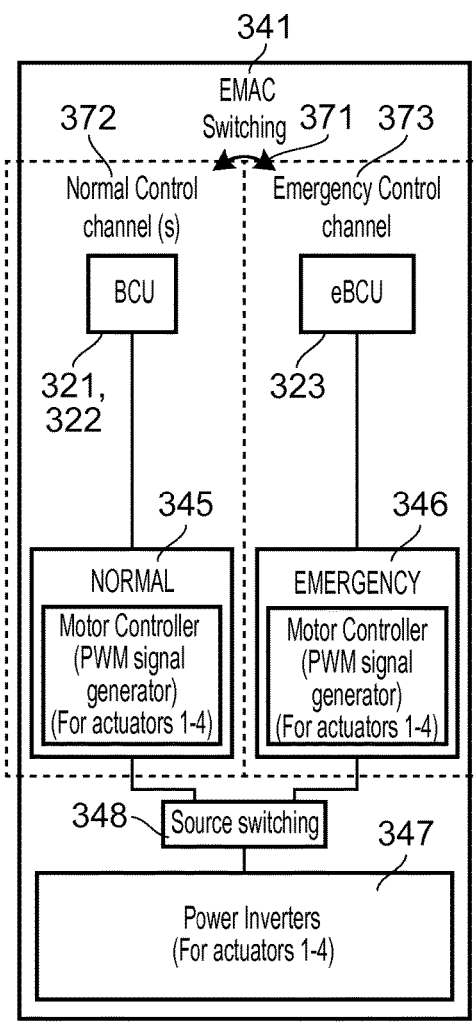
FIG. 14 illustrates a first example of a control scheme for the smart EMAC shown in FIG. 13.

FIG. 14 illustrates a first example of a control scheme for the smart EMAC 341 shown in FIG. 13. In this configuration the braking system control is switched 371 unitarily between normal 372 and emergency 373 channels such that the when the brake control channel is switched from the normal channel (though the BCU function block 321/322) to the emergency channel (through the eBCU function block 323) the motor control channel is also switched from the normal channel (through the smart EMAC primary motor controller 345) to the emergency channel (through the smart EMAC secondary motor controller 346). In this way the normal brake control channel always communicates with the normal motor control channel, and the emergency brake control channel always communicates with the emergency motor control channel. The switching is therefore similar to that of the non-smart EMAC 141 of FIG. 4. As shown in FIG. 14 the smart EMAC further includes a source switch 348 for switching between the normal and emergency channels as both channels may be continuously transmitting. In a simplified arrangement an OR gate may be used in place of the source switch 348 if the control channels are not continuously transmitting. The OR gate may be arranged similarly to that shown in FIG. 6a.

Figure 15:
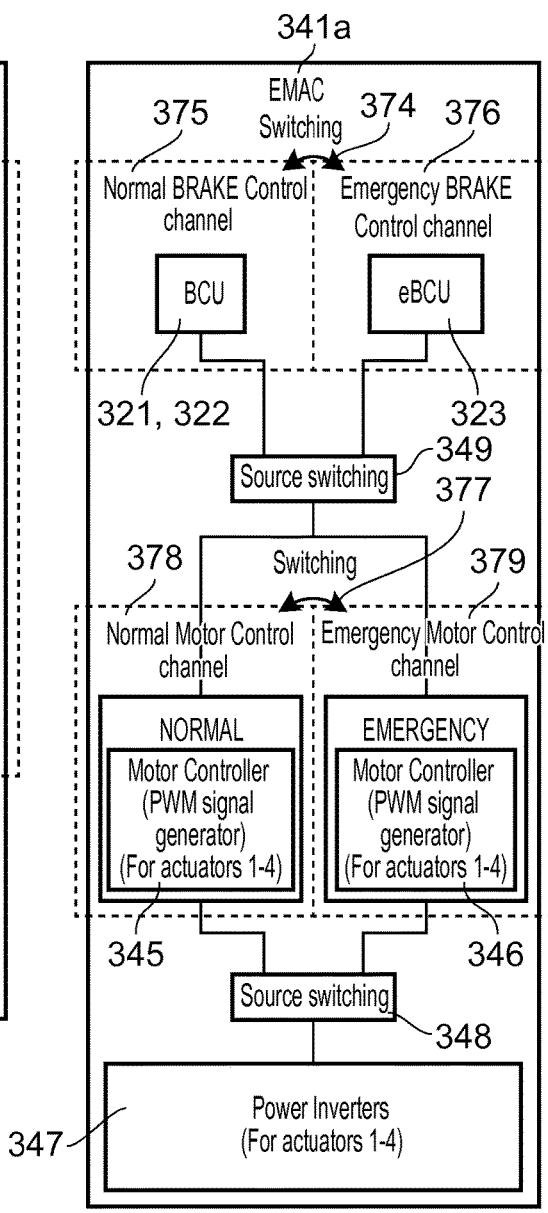
FIG. 15 illustrates a second example of a control scheme for the smart EMAC shown in FIG. 13.

FIG. 15 illustrates a second example of a control scheme for the smart EMAC shown in FIG. 13. In this configuration the active brake control channel of the BCU/eBCU function blocks and the active motor control channel of the smart EMAC 341a may be switched independently depending on failure conditions. Therefore the normal brake control channel (though the BCU 321/322 function blocks) may communicate with either the normal motor channel (through the smart EMAC primary motor controller 345) or the emergency motor channel (through the smart EMAC secondary motor controller 346). Similarly, the emergency brake control channel (though the eBCU function block 323) may communicate with either the normal motor channel (through the smart EMAC primary motor controller 345) or the emergency motor channel (through the smart EMAC secondary motor controller 346).

Unlike the FIG. 14 control scheme, in FIG. 15 the brake channel control is switched 374 between normal (BCU function block) 372 and emergency (eBCU function block) 373 channels, and the source switch 348 is arranged to switch between the outputs from the normal and emergency motor controllers 345, 346. The EMAC 341a further includes a source switch 349 for switching 377 the brake control received from either the BCU function blocks 321, 322 or the eBCU function block 323 to either the normal motor control channel 378 or the emergency motor control channel 379. The switching is therefore similar to that of the non-smart EMAC 141a of FIG. 5. In a simplified arrangement an OR gate may be used in place of the source switches 348, 349 if the control channels are not continuously transmitting. The OR gate may be arranged similarly to that shown in FIG. 7a.

The dissimilar motor controllers 345, 346 may be as described above with reference to FIGS. 6 and 7.

Figure 16:
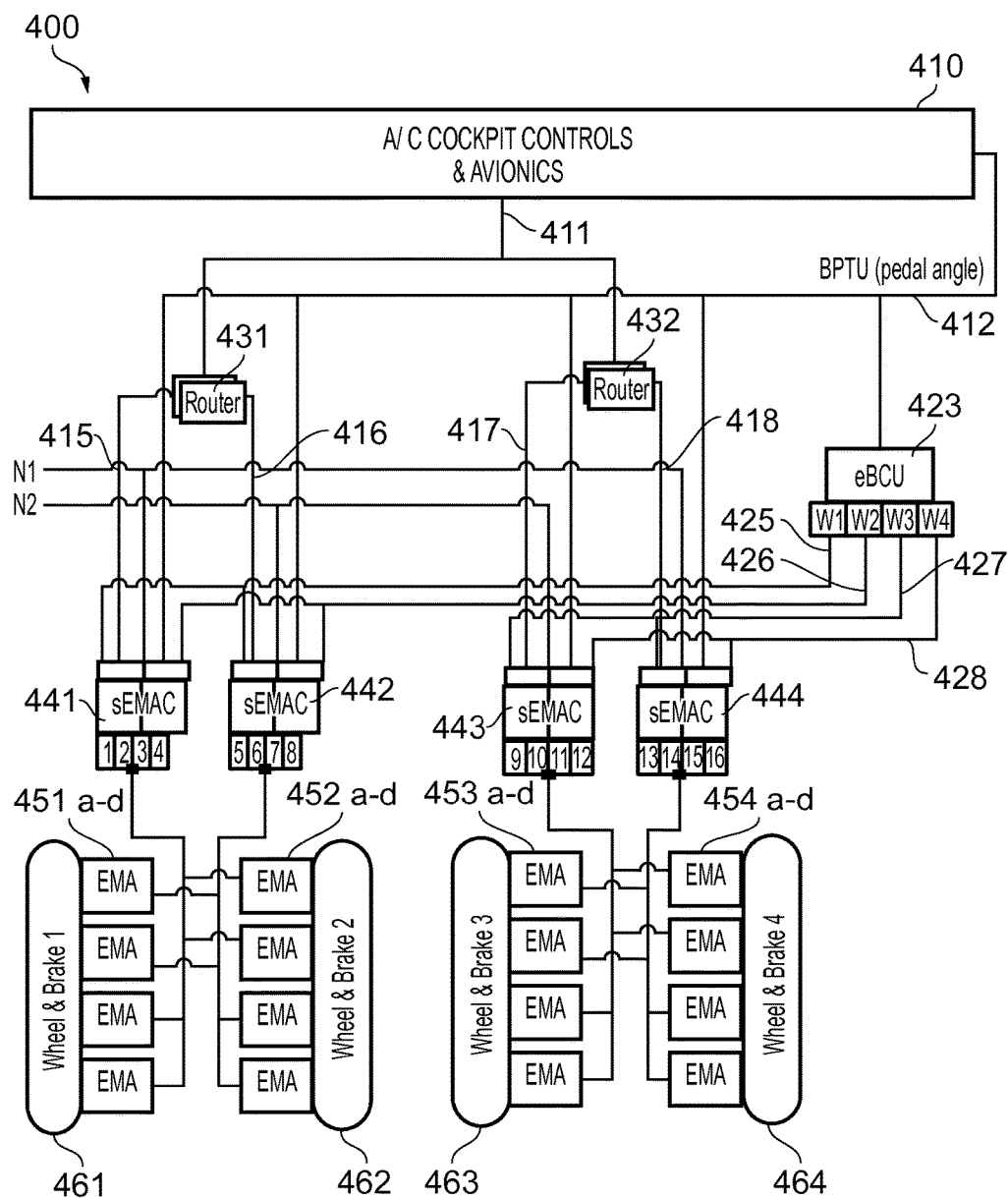
FIG. 16 illustrates a fourth embodiment of an electrically actuated aircraft braking system featuring distributed avionics, with "smart" EMACs and separate emergency BCU functionality.

FIG. 16 illustrates a fourth embodiment of an electrically actuated aircraft braking system 400 featuring distributed avionics, with "smart" EMACs. The braking system 400 shares many similarities with the system 300 of FIG. 11 and differs only in that the eBCU functionality remains in a separate LRU, like in the system 100 of FIG. 1.

In the braking system 400 the aircraft cockpit controls and avionics 410, the routers 431, 432, discrete signal route 412, local databuses 415-418, power routes N1, N2, EMAs 451-454 and wheel and brake groups 461-464 are identical to those counterparts described above in the system 300.

The smart EMACs 441-444 are identical to the smart EMACs 441-444 except that the smart EMACs 441-444 do not include an eBCU function block. Instead the eBCU functionality is provided by separate eBCU 423. The eBCU 423 outputs brake control signals W1, W2, W3, W4 for each of the four wheel and brake groups 461, 462, 463, 464, respectively via discrete routes 425-428 to the emergency channel of the four smart EMACs 441-444. The eBCU 423 performs the same functions as the eBCU 123 described above.

Figure 17:
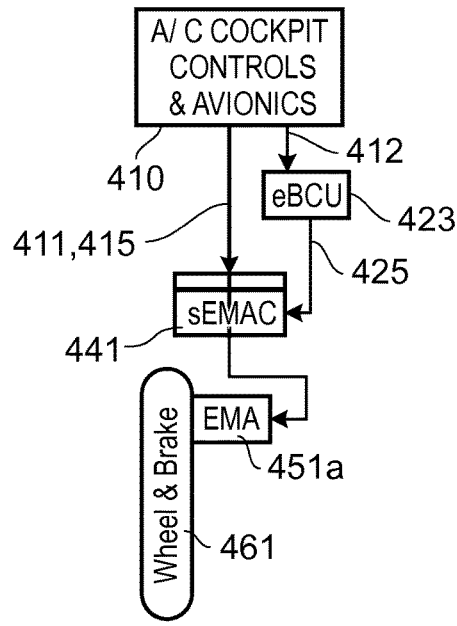
FIG. 17 illustrates a schematic of the control of a single EMA of the fourth embodiment.

FIG. 17 illustrates a schematic of the control of a single EMA 451a in the fourth embodiment in which the smart EMAC 441 is operable to compute brake force commands on a per wheel basis based on the databus 411, 415 and discrete 412 signals from the aircraft cockpit control and avionics 410. The smart EMAC 441 also receives electrical power to then provide power to drive the EMA 351a.

Figure 18:
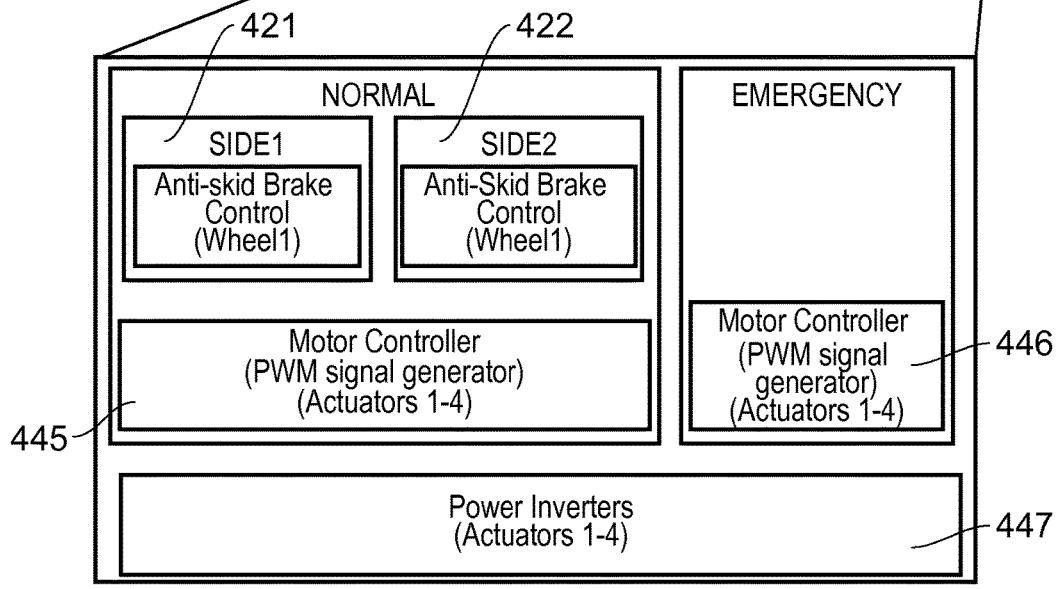
FIG. 18 illustrates a schematic of the "smart" EMAC used in the fourth embodiment having dissimilar normal and emergency motor controllers and integrated BCU functionality.

FIG. 18 illustrates schematically the normal and emergency channels within the smart EMAC 441. In the normal channel, the smart EMAC includes a side1 BCU function block 421, a side2 BCU function block 422, and a normal (primary) motor controller 445 which is a pulse-width modulation (PWM) signal generator for its four associated EMAs. In the emergency channel, the smart EMAC includes an emergency (secondary) motor controller 446 which is a PWM signal generator for its four EMAs. The EMAC also includes a power inverter 447 for its four EMAs. The side1 and side 2 BCU function blocks 421, 422 include fast-loop anti skid control.

Control schemes for switching between the normal and emergency channels in the smart EMAC 441 may be arranged similar to those described above in FIGS. 4 and 14 and FIGS. 15 and 15, modified accordingly to take into account that the eBCU 423 is in a separate LRU to the smart EMAC 441 whilst the BCU function blocks 421, 422 are integrated with the smart EMAC 441.

Figure 19:
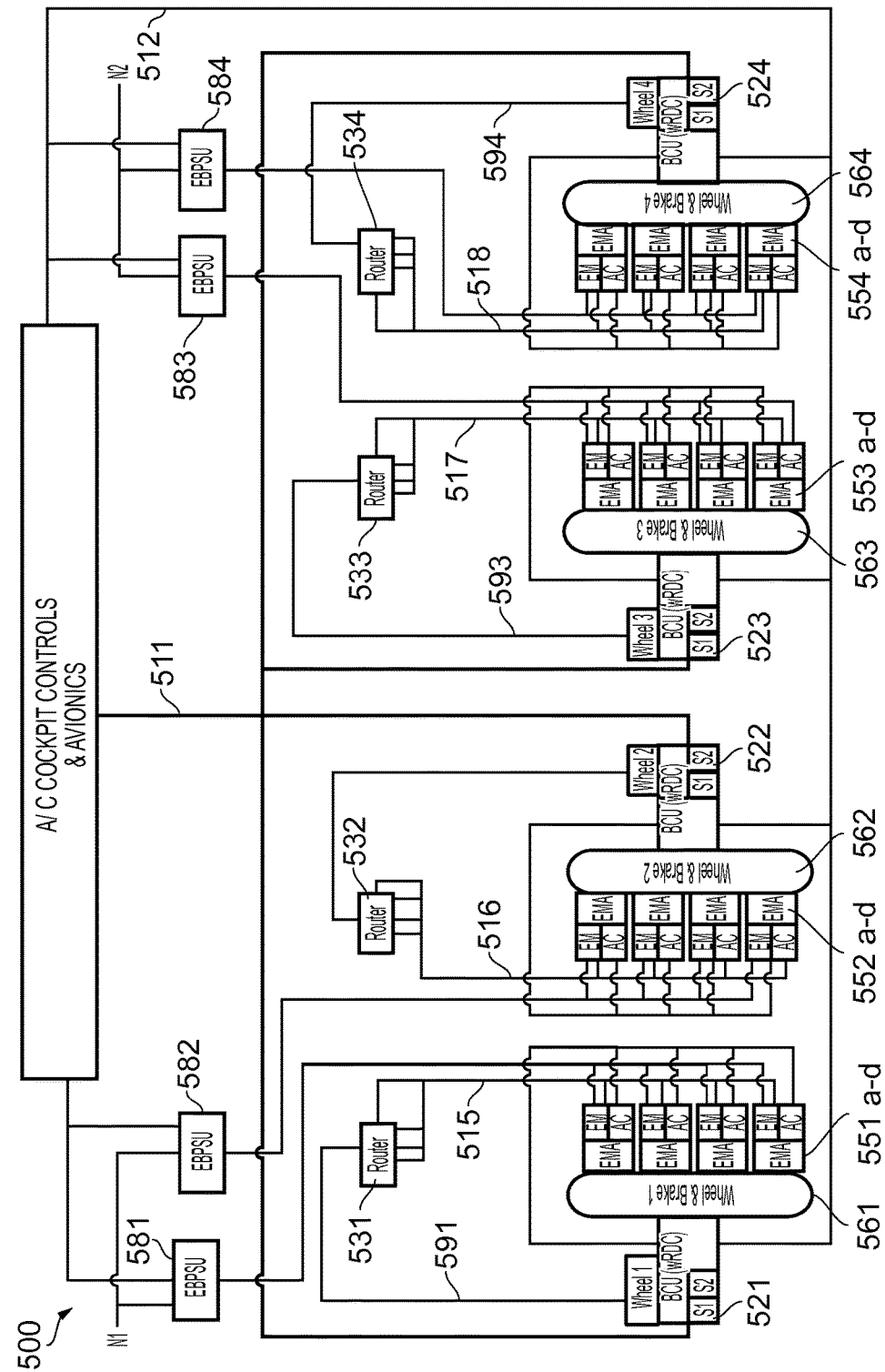
FIG. 19 illustrates a fifth embodiment of an electrically actuated aircraft braking system featuring fully distributed avionics, with "smart" EMAs and "smart" wheel/axle RDCs with integrated BCU and eBCU functionality.

FIG. 19 illustrates a fifth embodiment of an electrically actuated aircraft braking system 500 featuring "fully" distributed avionics. The braking system 500 shares many similarities with the system 200 of FIG. 8 with the difference that the BCUs/eBCU are replaced with wheel/axle mounted remote data concentrators incorporating BCU/eBCU functionality (BCU-wRDC).

In the braking system 500 the aircraft cockpit controls and avionics 510, the databus 511, discrete signal route 512, the routers 531-534, local databuses 515-518, power routes N1, N2, the EBPSUs 581-584, smart EMAs 551a-554d and wheel and brake groups 561-564 are identical to those counterparts described above in the system 200.

Each of the wheel and brake groups 561-564 has an associated respective BCU-wRDC 521-524. In the system 200 described above the side1 BCU 221, the side2 BCU 222 and the eBCU 223 each have brake control signal outputs W1, W2, W3, W4 for the wheel and brake groups 1-4 respectively. In the system 500 each of the BCU-wRDCs 521-524 have side1, side2 and emergency brake control signal outputs for its associated wheel and brake group only, and not for the other wheel and brake groups. For example, the BCU-wRDC 521 has side1, side2 and emergency brake control signal outputs for wheel and brake group1, 561, only; BCU-wRDC 522 has side1, side2 and emergency brake control signal outputs for wheel and brake group2, 562, only, etc. The same functionality provided by the BCUs 221, 222 and eBCU 223 in the system 200 are collectively provided by the BCU-wRDCs 521-524 of the system 500.

BCU-wRDC 521 outputs brake control signals for wheel and brake group1, 561, via local databus 591 to routers 531. Router 531 is coupled via local databus 515 to all smart EMAs 551a-d of wheel and brake group1.

BCU-wRDC 522 outputs brake control signals for wheel and brake group2, 562, via local databus 592 to router 532. Router 532 is coupled via local databus 516 to all smart EMAs 552a-d of wheel and brake group2.

BCU-wRDC 523 outputs brake control signals for wheel and brake group3, 563, via local databus 593 to routers 533. Router 533 is coupled via local databus 517 to all smart EMAs 553a-d of wheel and brake group3.

BCU-wRDC 524 outputs brake control signals for wheel and brake group4, 564, via local databus 594 to router 534. Router 534 is coupled via local databus 518 to all smart EMAs 554a-d of wheel and brake group4.

The routers 531-534 are preferably located on or close to the wheel brakes to reduce wiring weight, and would need to be ruggedized to handle this harsh environment.

As mentioned above, the smart EMAs 551a-554d are identical to the smart EMAs 251a-254d described with reference to FIG. 2, and include dissimilar normal and emergency motor controllers for driving their respective integrated EMA motors.

FIG. 20 illustrates a schematic of the control of a single smart EMA 551a in the fifth embodiment in which the smart EMA is operable to receive brake force commands on a per wheel basis from its associated BCU-wRDC 521. The smart EMA 551a interprets the brake force commands and receives electrical power from the EBPSU 581 (not shown in FIG. 20) to then provide power to drive the motor of the smart EMA.

FIG. 21 illustrates schematically two dissimilar motor control paths within the smart EMA 551a. The smart EMA includes a normal (primary) motor controller 545, an emergency (secondary) motor controller 546, and a power inverter 547 for its motor identical smart EMAs of the system 200.

FIG. 22 illustrates schematically the different BCU function blocks within the BCU-wRDC 521. The BCU-wRDC 521 includes a side1 BCU function block 525 for wheel and brake group1, a side2 BCU function block 526 for wheel and brake group1, and an eBCU function block 527 for wheel and brake group1. The side1 and side2 BCU function blocks 525, 526 include fast loop anti-skid for the braking wheel of the wheel and brake group1, 561. The eBCU function block 527 may or may not also include fast loop anti-skid for the braking wheel of the wheel and brake group1, 561. The BCU/eBCU function blocks 525-527 are coupled to the databus 511 and analogue/discrete 512 inputs from the aircraft cockpit controls and avionics 510. The BCU-wRDCs 521-524 are constructed identically as LRUs.

Figures 23, 24:
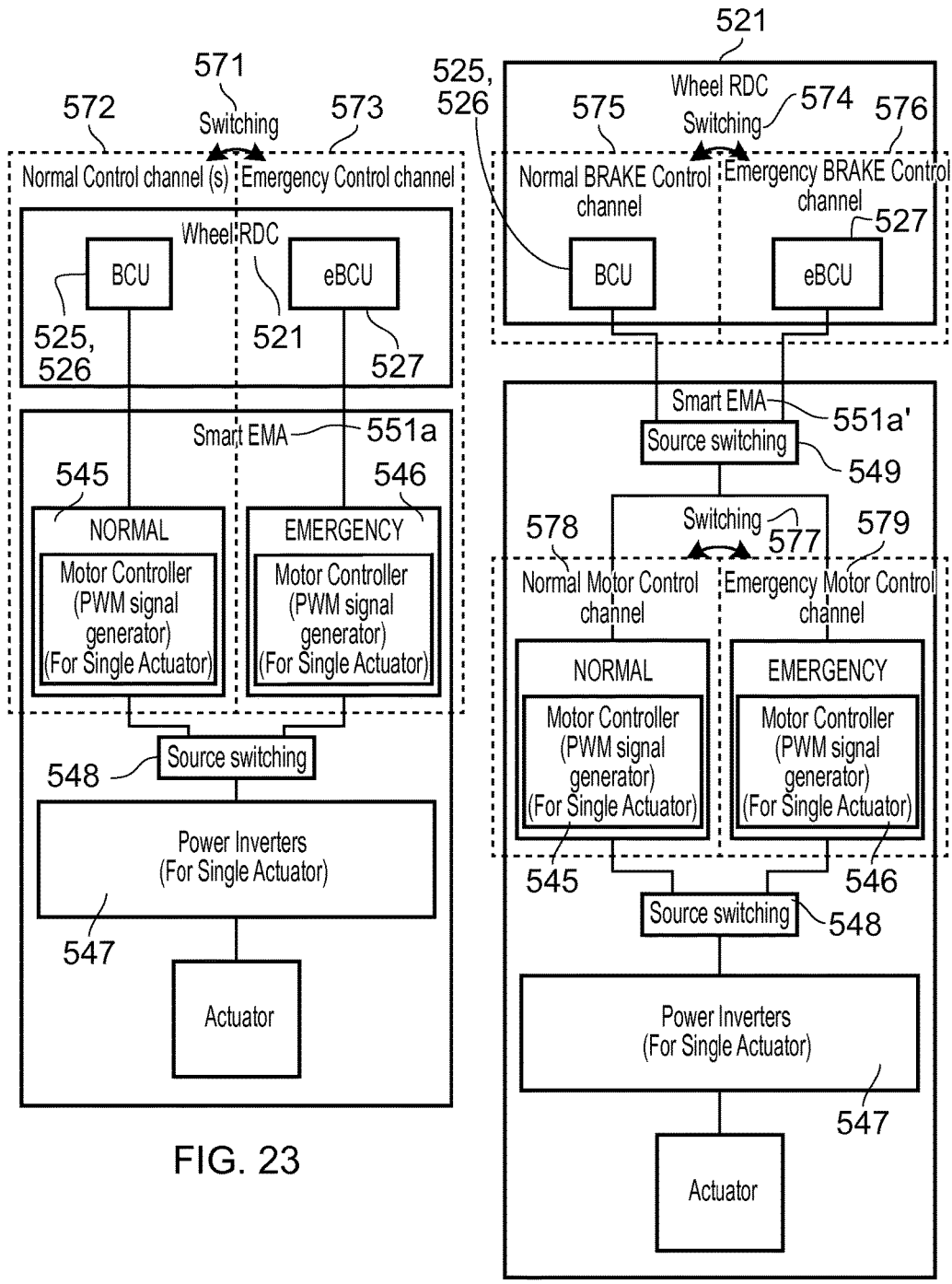
FIG. 23 illustrates a first example of a control scheme for the smart EMA shown in FIG. 21.
FIG. 24 illustrates a second example of a control scheme for the smart EMA shown in FIG. 21.

FIG. 23 illustrates a first example of a control scheme for the smart EMA 551a shown in FIG. 21. In this configuration the braking system control is switched 571 unitarily between normal 572 and emergency 573 channels such that the when the BCU-wRDC 521 brake control channel is switched from the normal channel (though the BCU function block 525/625) to the emergency channel (through the eBCU function block 527) the motor control channel of the smart EMA 551a is also switched from the normal channel (through the smart EMA primary motor controller 545) to the emergency channel (through the smart EMA secondary motor controller 546). In this way the normal brake control channel always communicates with the normal motor control channel, and the emergency brake control channel always communicates with the emergency motor control channel. The switching is therefore similar to that of the EMAC 141 of FIG. 4. As shown in FIG. 23 the smart EMA further includes a source switch 548 for switching between the normal and emergency channels as both channels may be continuously transmitting. In a simplified arrangement an OR gate may be used in place of the source switch 548 if the control channels are not continuously transmitting. The OR gate may be arranged similarly to that shown in FIG. 6a.

FIG. 24 illustrates a second example of a control scheme for the smart EMA 551a' shown in FIG. 21. In this configuration the active brake control channel of the BCU/eBCU function blocks and the active motor control channel of the smart EMA 551a' may be switched independently depending on failure conditions. Therefore the normal brake control channel (though the BCU 525/526 function blocks) may communicate with either the normal motor channel (through the smart EMA primary motor controller 545) or the emergency motor channel (through the smart EMA secondary motor controller 546). Similarly, the emergency brake control channel (though the eBCU function block 527) may communicate with either the normal motor channel (through the smart EMA primary motor controller 545) or the emergency motor channel (through the smart EMA secondary motor controller 546).

Unlike the FIG. 23 control scheme, in FIG. 24 the brake channel control is switched 574 between normal (BCU function block) 575 and emergency (eBCU function block) 576 channels, and the source switch 548 is arranged to switch between the outputs from the normal and emergency motor controllers 545, 546. The smart EMA 551a' further includes a source switch 549 for switching 577 the brake control received from either the BCU function blocks 525, 526 or the eBCU function block 527 to either the normal motor control channel 578 or the emergency motor control channel 579. The switching is therefore similar to that of the EMAC 141a of FIG. 5. In a simplified arrangement an OR gate may be used in place of the source switches 548, 549 if the control channels are not continuously transmitting. The OR gate may be arranged similarly to that shown in FIG. 7a.

The dissimilar motor controllers 545, 546 may be as described above with reference to FIGS. 6 and 7.

Figure 25:
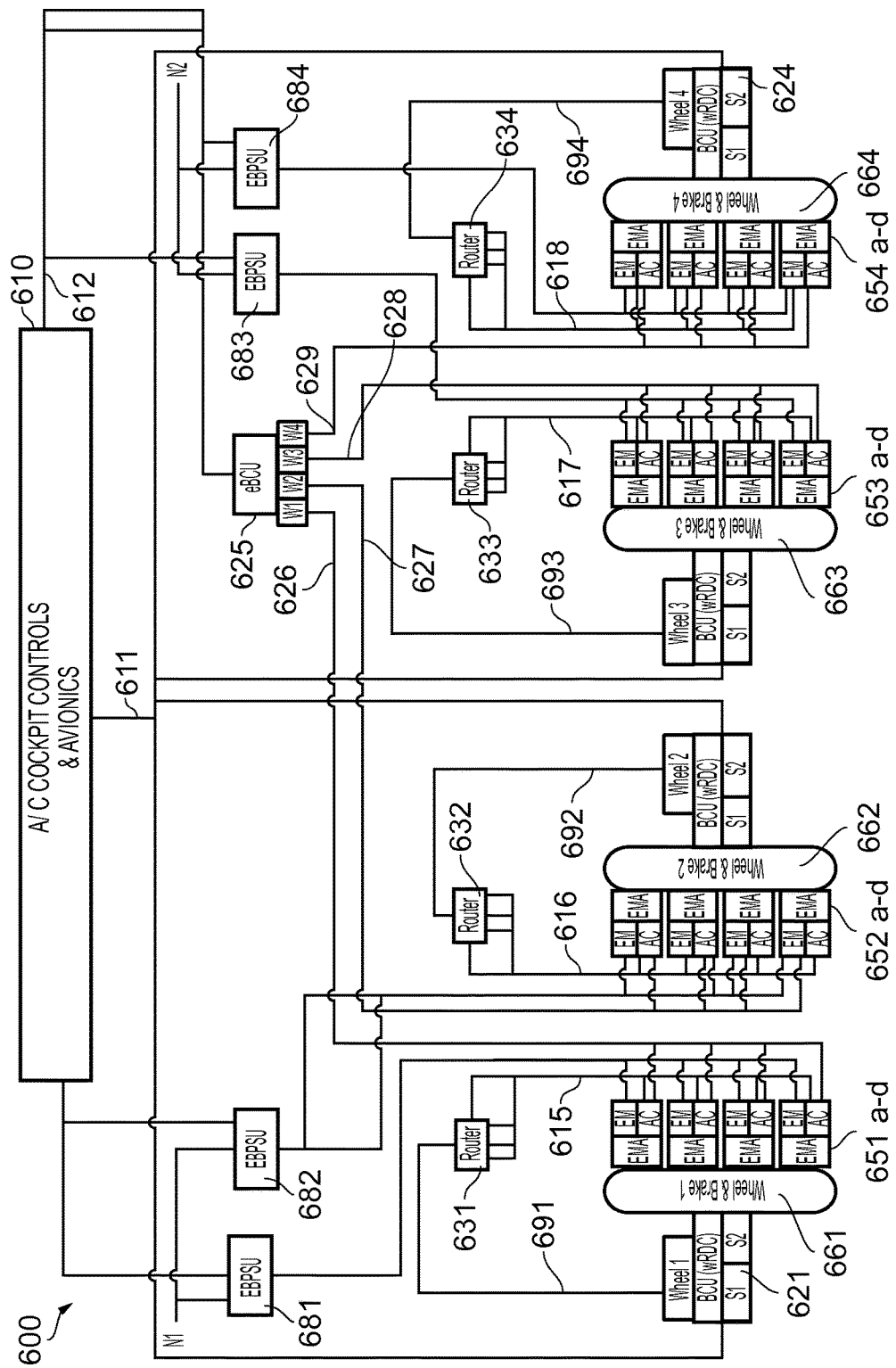
FIG. 25 illustrates a sixth embodiment of an electrically actuated aircraft braking system featuring fully distributed avionics, with "smart" EMAs and "smart" wheel/axle RDCs with integrated BCU functionality, and separate eBCU functionality.

FIG. 25 illustrates a sixth embodiment of an electrically actuated aircraft braking system 600 featuring "fully" distributed avionics, with "smart" EMAs. The braking system 600 shares many similarities with the system 500 of FIG. 19 and differs only in that the eBCU functionality remains in a separate LRU, like in the system 200 of FIG. 8.

In the braking system 600 the aircraft cockpit controls and avionics 610, the databus 611, discrete signal route 612, the routers 631-634, local databuses 615-619 and 691-695, power routes N1, N2, EBPSUs 681-684, smart EMAs 651a-654d and wheel and brake groups 661-664 are identical to those counterparts described above in the system 500.

The BCU-wRDCs 621-624 are identical to the BCU-wRDCs 521-524 except that the BCU-wRDCs 621-624 do not include an eBCU function block. Instead the eBCU functionality is provided by separate eBCU 625. The eBCU 625 outputs brake control signals W1, W2, W3, W4 for each of the four wheel and brake groups 661, 662, 663, 664, respectively via discrete routes 626-629 to the emergency channel of the four smart EMAs 651a-654d. The eBCU 625 performs the same functions as the eBCU 123 described above.

FIG. 26 illustrates a schematic of the control of a single smart EMA 651a in the sixth embodiment in which the smart EMA is operable to receive brake force commands on a per wheel basis from either the BCU-wRDC 621 or the eBCU 625. The smart EMA 651a interprets the brake force commands and receives electrical power from the EBPSU 681 (not shown in FIG. 26) to then provide power to drive the motor of the smart EMA.

FIG. 27 illustrates schematically two dissimilar motor control paths within the smart EMA 651a. The smart EMA includes a normal (primary) motor controller 645, an emergency (secondary) motor controller 646, and a power inverter 647 for its motor identical smart EMAs of the system 500.

FIG. 28 illustrates schematically the different BCU function blocks within the BCU-wRDC 621. The BCU-wRDC 621 includes a side1 BCU function block 625 for wheel and brake group1, and a side2 BCU function block 626 for wheel and brake group1. The side1 and side2 BCU function blocks 625, 626 include fast loop anti-skid for the braking wheel of the wheel and brake group1, 561. The BCU function blocks are coupled by the databus 611 to the aircraft cockpit controls and avionics 610. The BCU-wRDCs 621-624 are constructed identically as LRUs.

The smart EMAs 651a-d may operate under one of the control schemes illustrated in FIGS. 23 and 24, with the only difference that the eBCU function block 527 is provided in the separate eBCU, not in the BCU-wRDC.

Figure 29:
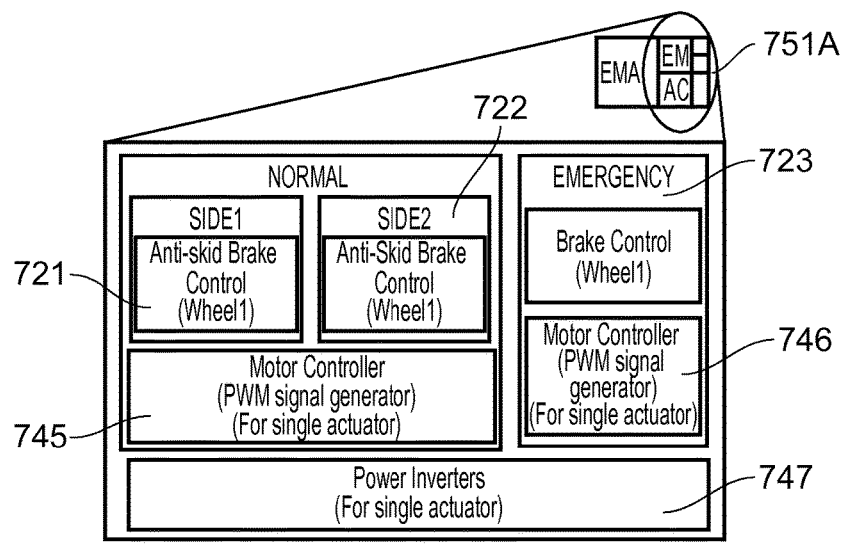
FIG. 29 illustrates a fully smart EMA with integrated BCU and eBCU functionality for use in a fully distributed electrically actuated aircraft braking system architecture.
Figures 30, 31:
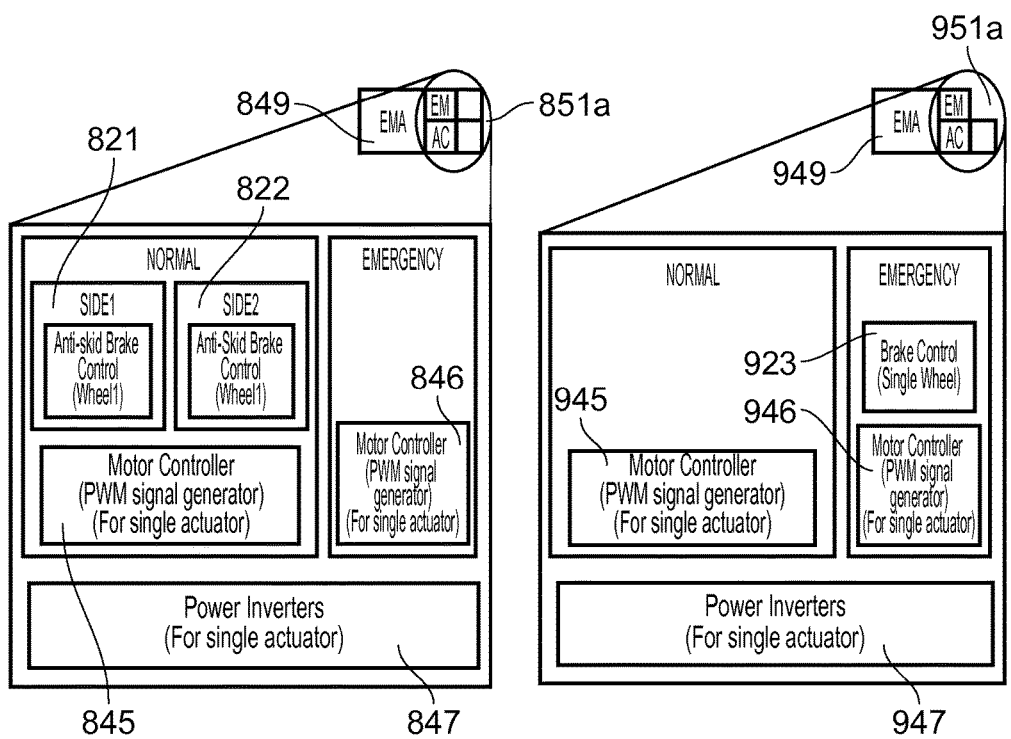
FIG. 30 illustrates a smart EMA with integrated BCU functionality for use in a fully distributed electrically actuated aircraft braking system architecture.
FIG. 31 illustrates a smart EMA with integrated eBCU functionality for use in a fully distributed electrically actuated aircraft braking system architecture.

FIGS. 29 to 31 illustrate LRUs for variants of the fully distributed architecture described above with reference to FIG. 19 of the fifth embodiment. In FIG. 29, the LRU is a fully smart EMA 751a in which not only the EMAC functionality (with normal and emergency channels) but also the BCU functionality (with normal and emergency channels) is integrated with the EMA into a single LRU. The fully smart EMA 751a includes the smart EMAC function blocks (side1 BCU 721, side2 BCU 722, eBCU 723, primary motor controller 745, emergency motor controller 746, and power inverter 747) identical to the smart EMA function blocks of FIG. 13, and the EMA. As each fully smart EMA LRU may be separately computing anti-skid control for its corresponding wheel and brake group then it may be necessary to synchronise between fully smart EMA LRUs.

In FIG. 30, the LRU is a fully smart EMA 851a in which not only the EMAC functionality (with normal and emergency motor control channels) but also the BCU functionality (with normal brake control channels) is integrated with the EMA into a single LRU. The fully smart EMA 851a includes the smart EMAC function blocks (side1 BCU 821, side2 BCU 822, primary motor controller 845, emergency motor controller 846, and power inverter 847) identical to the smart EMAC function blocks of FIG. 18, and the EMA 849. The eBCU is disposed in a separate LRU, similar to the FIG. 25 architecture.

In FIG. 31, the LRU is a fully smart EMA 951a in which not only the EMAC functionality (with normal and emergency motor control channels) but also the eBCU functionality is integrated with the EMA into a single LRU. The fully smart EMA 951a includes the smart EMAC function blocks (eBCU 923, primary motor controller 945, emergency motor controller 946, and power inverter 947) similar to FIG. 31, and the EMA 949. The side1 and side2 BCUs are disposed in a separate LRU, similar to the FIG. 25 architecture.

Figures 32, 33:
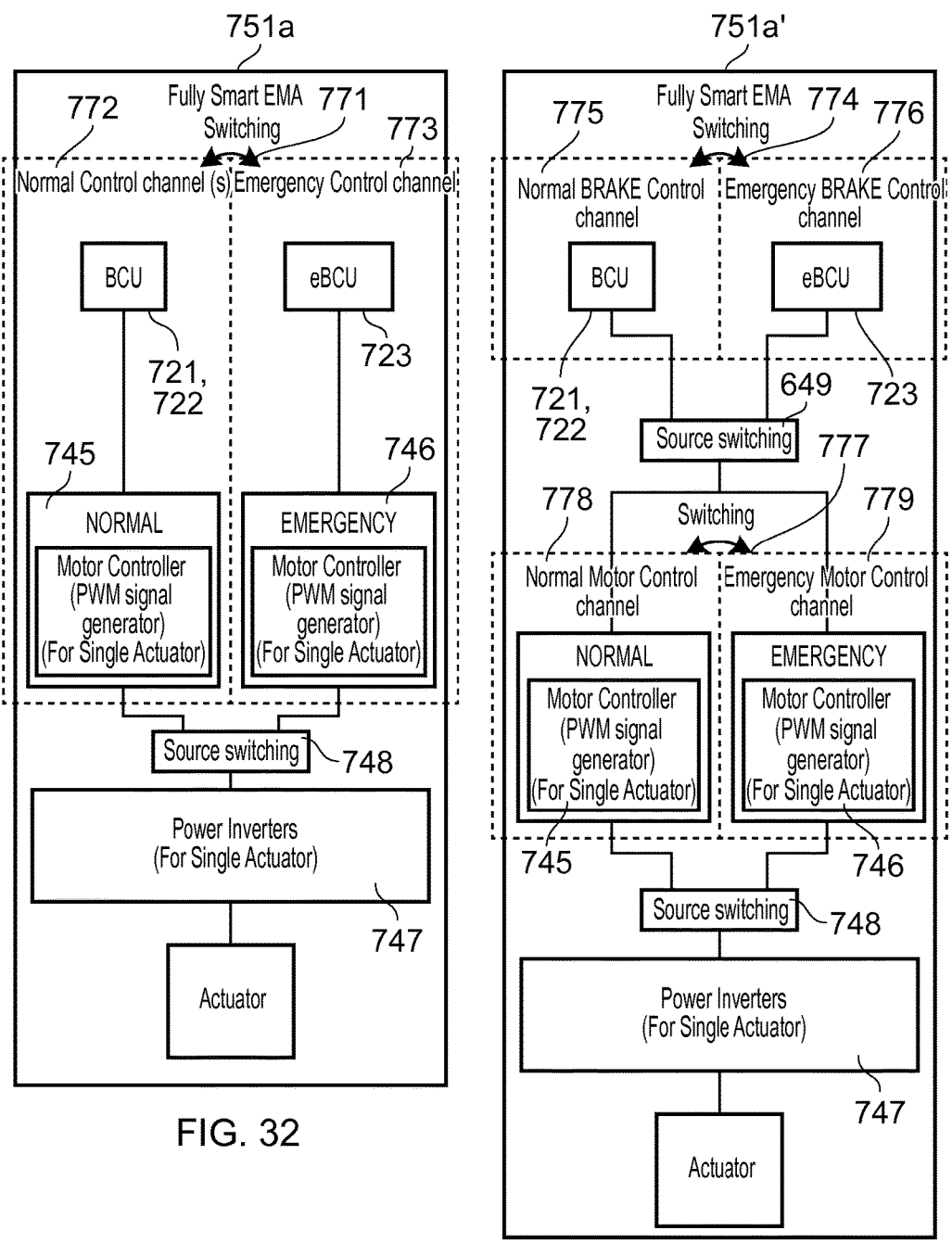
FIG. 32 illustrates a first example of a control scheme for the fully smart EMA shown in FIG. 29.
FIG. 33 illustrates a second example of a control scheme for the fully smart EMA shown in FIG. 29.

FIG. 32 illustrates a first example of a control scheme for the fully smart EMA 751a shown in FIG. 29. In this configuration the braking system control is switched 771 unitarily between normal 772 and emergency 773 channels such that the when the brake control channel is switched from the normal channel (though the BCU 721) to the emergency channel (through the eBCU 723) the motor control channel is also switched from the normal channel (through the smart EMA primary motor controller 745) to the emergency channel (through the smart EMA secondary motor controller 746). In this way the normal brake control channel always communicates with the normal motor control channel, and the emergency brake control channel always communicates with the emergency motor control channel. The switching is therefore similar to that of the EMAC 141 of FIG. 4. As shown in FIG. 32 the fully smart EMA further includes a source switch 748 for switching between the normal and emergency channels as both channels may be continuously transmitting. In a simplified arrangement an OR gate may be used in place of the source switch 748 if the control channels are not continuously transmitting. The OR gate may be arranged similarly to that shown in FIG. 6a.

FIG. 33 illustrates a second example of a control scheme for the fully smart EMA 751a' shown in FIG. 29. In this configuration the active brake control channel of the BCU/eBCU and the active motor control channel of the fully smart EMA 751a' may be switched independently depending on failure conditions. Therefore the normal brake control channel 775 (though the BCU 721) may communicate with either the normal motor channel 778 (through the smart EMA primary motor controller 745) or the emergency motor channel 779 (through the smart EMA secondary motor controller 746). Similarly, the emergency brake control channel 776 (though the eBCU 723) may communicate with either the normal motor channel 778 (through the smart EMA primary motor controller 745) or the emergency motor channel 779 (through the smart EMA secondary motor controller 746).

Unlike the FIG. 32 control scheme, in FIG. 33 the brake channel control is switched 774 between normal (BCU) 775 and emergency (eBCU) 776 channels, and the source switch 748 is arranged to switch between the outputs from the normal and emergency motor controllers 745, 746. The fully smart EMA 751a' further includes a source switch 749 for switching 777 the brake control received from either the BCU 721 or the eBCU 723 to either the normal motor control channel 778 or the emergency motor control channel 779. The switching is therefore similar to that of the EMAC 141a of FIG. 5. In a simplified arrangement an OR gate may be used in place of the source switch 748, 749 if the control channels are not continuously transmitting. The OR gate may be arranged similarly to that shown in FIG. 7a.

The dissimilar motor controllers 745, 746 may be as described above with reference to FIGS. 6 and 7.

The control schemes for the fully smart EMAs 851a and 951a of FIGS. 30 and 31 may be similar to those described above with reference to FIGS. 32 and 33, but where BCU or eBCU functionality is provided in a separate LRU, as described with reference to the FIG. 23 and FIG. 24 control schemes.

Although the invention has been described above with reference to one or more preferred embodiments, it will be appreciated that various changes or modifications may be made without departing from the scope of the invention as defined in the appended claims.

The invention claimed is:
1. An electrically actuated braking system for an aircraft, comprising:

an electro-mechanical brake actuator proximate a wheel of the aircraft, the electro-mechanical brake actuator including a motor;

an electro-mechanical actuator controller (EMAC) including a first motor controller for generating a first drive signal for the electro-mechanical brake actuator, and a second motor controller for generating a second drive signal for the electro-mechanical brake actuator, wherein the first motor controller and the second motor controller are dissimilar so as to provide protection against common mode failure of the first and second motor controllers.

2. An electrically actuated braking system according to claim 1, further comprising a braking control unit (BCU) for generating a braking force command signal for the EMAC during a normal operating mode, and an emergency braking control unit (eBCU) for generating a braking force command signal for the EMAC during an emergency mode of operation.

3. An electrically actuated braking system according to claim 2, wherein the BCU is operable on a normal brake channel, the eBCU is operable on an emergency brake channel, the first motor controller is operable on a normal motor control channel, and the second motor controller is operable on an emergency motor control channel.

4. An electrically actuated braking system according to claim 3, wherein the BCU is configured to communicate with either the first motor controller or the second motor controller, and the eBCU is configured to communicate with either the first motor controller or the second motor controller.

5. An electrically actuated braking system according to claim 4, further comprising a first switch for switching between the normal and emergency brake channels, and a second switch for switching between the normal and emergency motor control channels.

6. An electrically actuated braking system according to claim 5, wherein the first switch and the second switch are independently switchable.

7. An electrically actuated braking system according to claim 3, wherein the BCU is configured to communicate with the first motor controller and not the second motor controller, and the eBCU is configured to communicate with the second motor controller and not the first motor controller.

8. An electrically actuated braking system according to claim 7, wherein the normal brake channel and the normal motor control channel are coupled so as to form a normal channel, and the emergency brake channel and the emergency motor control channel are coupled so as to form an emergency channel, and the system further comprises a switch for switching between the normal channel and the and emergency channel.

9. An electrically actuated braking system according to claim 3, further comprising a source switch operatively coupled between the normal and emergency motor control channels and the electro-mechanical brake actuator for switching the electro-mechanical brake actuator control depending on the selected motor control channel.

10. An electrically actuated braking system according to claim 3, further comprising an OR gate operatively coupled between the normal and emergency motor control channels and the electro-mechanical brake actuator for controlling the electro-mechanical brake actuator depending on the operative motor control channel.

11. An electrically actuated braking system according to claim 3, wherein the BCU includes redundant brake control channels each for communicating with aircraft cockpit controls and avionics via a respective data bus.

12. An electrically actuated braking system according to claim 2, wherein the BCU and/or the eBCU are disposed remote from the EMAC.

13. An electrically actuated braking system according to claim 12, wherein the BCU, and optionally also the eBCU, is disposed in a remote data concentrator (RDC) configured for mounting in a wheel or axle region of landing gear of the aircraft.

14. An electrically actuated braking system according to claim 2, wherein the BCU and/or the eBCU are disposed together with the EMAC in a common line replaceable unit (LRU).

15. An electrically actuated braking system according to claim 2, wherein the BCU is operable to perform anti-skid brake control.

16. An electrically actuated braking system according to claim 2, wherein the eBCU is operable to perform anti-skid brake control.

17. An electrically actuated braking system according to claim 1, wherein the first motor controller and the second motor controller each comprise hardware for generating a pulse-width modulation signal.

18. An electrically actuated braking system according to claim 1, wherein the first motor controller and the second motor controller each comprise a different hardware selected from the group comprising: a microprocessor, a microcontroller, a digital signal processor, an application specific integrated circuit, a programmable logic device, a complex programmable logic device, a field programmable gate array, and a transistor based discrete electronics switching circuit.

19. An electrically actuated braking system according to claim 1, wherein the EMAC is disposed remote from the electro-mechanical brake actuator.

20. An electrically actuated braking system according to claim 1, wherein the EMAC is disposed together with the electro-mechanical brake actuator in a common line replaceable unit (LRU).

21. An aircraft including an electrically actuated braking system according to claim 1.

22. An electrically actuated braking system for an aircraft comprising:
an electro-mechanical brake actuator proximate a wheel of the aircraft, the electro-mechanical brake actuator including a motor;
an electro-mechanical actuator controller (EMAC) including a first motor controller configured to generate a first drive signal for the motor of the electro-mechanical brake actuator, and a second motor controller configured to generate a second drive signal for motor of the electro-mechanical brake actuator, wherein the first motor controller includes electronic hardware configured to generate the first drive signal, which is dissimilar to electronic hardware included in the second motor controller configured to generate the second drive signal, wherein the motor in the electro-mechanical brake actuator is configured to be actuated by the first and second drive signals.

23. The electrically actuated braking system of claim 22 wherein the electronic hardware in the first controller is one of a group consisting of a microprocessor, a microcontroller, a digital signal processor, an application specific integrated circuit, a programmable logic device, a complex programmable logic device, a field programmable gate array, and a transistor based discrete electronics switching circuit, and the electronic hardware in the second controller is another one of the group.

\* \* \* \* \*